_United States Patent_ [19]

Moriya et al.

[11] Patent Number: 4,918,133

[45] Date of Patent: Apr. 17, 1990

[54] CYCLOOLEFIN TYPE RANDOM COPOLYMER COMPOSITIONS

[75] Inventors: Satoru Moriya; Akio Ishimoto; Yoshinori Akana; Yozo Yamamoto; Kotaro Kishimura; Fumitoshi Ikejiri, all of Kuga, Japan

[73] Assignee: Mitsui Petrochemical Industries, Ltd., Tokyo, Japan

[21] Appl. No.: 363,884

[22] PCT Filed: Oct. 7, 1988

[86] PCT No.: PCT/JP88/01027

§ 371 Date: Jun. 7, 1989

§ 102(e) Date: Jun. 7, 1989

[87] PCT Pub. No.: WO89/03413

PCT Pub. Date: Apr. 20, 1989

[30] Foreign Application Priority Data

| Oct. 8, 1987 | [JP] | Japan | 62-254007 |
| Dec. 18, 1987 | [JP] | Japan | 62-322609 |
| Dec. 18, 1987 | [JP] | Japan | 62-322610 |
| Dec. 18, 1987 | [JP] | Japan | 62-322611 |
| Apr. 6, 1988 | [JP] | Japan | 63-86049 |
| Apr. 6, 1988 | [JP] | Japan | 63-86050 |
| Jul. 20, 1988 | [JP] | Japan | 63-181401 |
| Jul. 20, 1988 | [JP] | Japan | 63-181402 |
| Jul. 20, 1988 | [JP] | Japan | 63-181403 |
| Jul. 20, 1988 | [JP] | Japan | 63-181404 |
| Jul. 20, 1988 | [JP] | Japan | 63-181405 |

[51] Int. Cl.$^4$ .................. C08L 23/16; C08L 23/08; C08L 53/02; C08L 45/00
[52] U.S. Cl. .................. 524/518; 524/553; 525/210; 525/211; 525/97
[58] Field of Search ............ 525/210, 211; 526/281; 524/518

[56] References Cited

U.S. PATENT DOCUMENTS

| 4,614,778 | 9/1986 | Kajuira et al. | 526/281 |
| 4,720,715 | 1/1988 | Omae et al. | 526/281 |

FOREIGN PATENT DOCUMENTS

| 203799 | 12/1986 | European Pat. Off. . |
| 55-78038 | 6/1980 | Japan . |
| 61-292601 | 12/1986 | Japan . |
| 62-215611 | 9/1987 | Japan . |

_Primary Examiner_—Carman J. Seccuro
_Attorney, Agent, or Firm_—Sherman and Shalloway

[57] ABSTRACT

In accordance with the present invention, there are provided cycloolefin type random copolymer compositions excellent in heat resistance, chemical resistance, rigidity, impact resistance, etc., which comprise (A) a cycloolefin type random copolymer containing an ethylene component and a cycloolefin component and having an intrinsic viscosity $[\eta]$ of 0.05–10 dl/g as measured at 135° C. in decalin and a softening temperature (TMA) of not lower than 70° C., and (B) one or more non-rigid copolymers selected from the group consisting of:
  (i) a cycloolefin type random copolymer containing an ethylene component, at least one other α-olefin component and a cycloolefin component and having an intrinsic viscosity $[\eta]$ of 0.01–10 dl/g as measured at 135° C. in decalin and a softening temperature (TMA) of below 70° C.,
  (ii) a non-crystalline to low crystalline α-olefin type elastomeric copolymer formed from at least two α-olefins,
  (iii) an α-olefin-diene type elastomeric copolymer formed from at least two α-olefins and at least one non-conjugated diene, and
  (iv) an aromatic vinyl type hydrocarbon-conjugated diene copolymer or a hydrogenated product thereof,
and optionally
(c) an inorganic filler or organic filler.

10 Claims, 5 Drawing Sheets

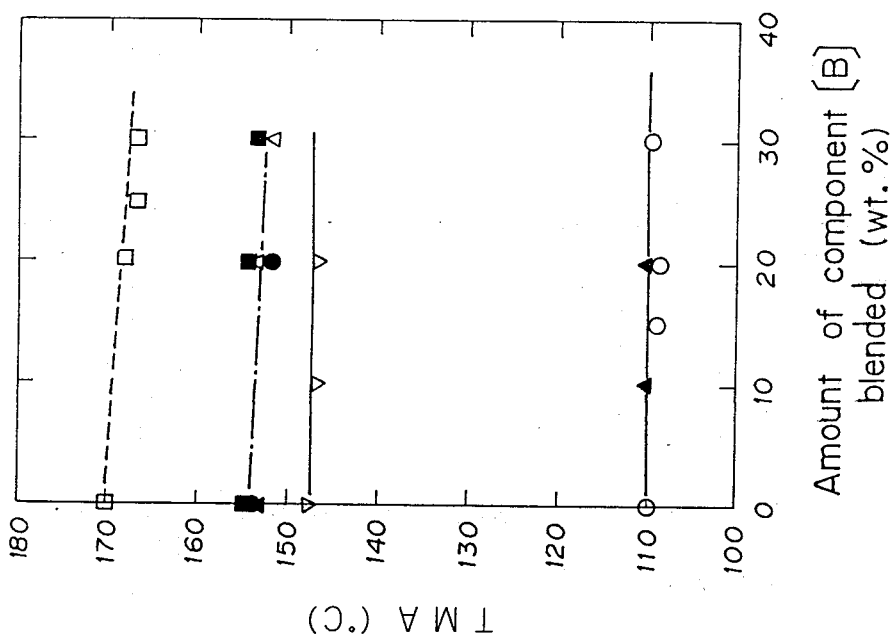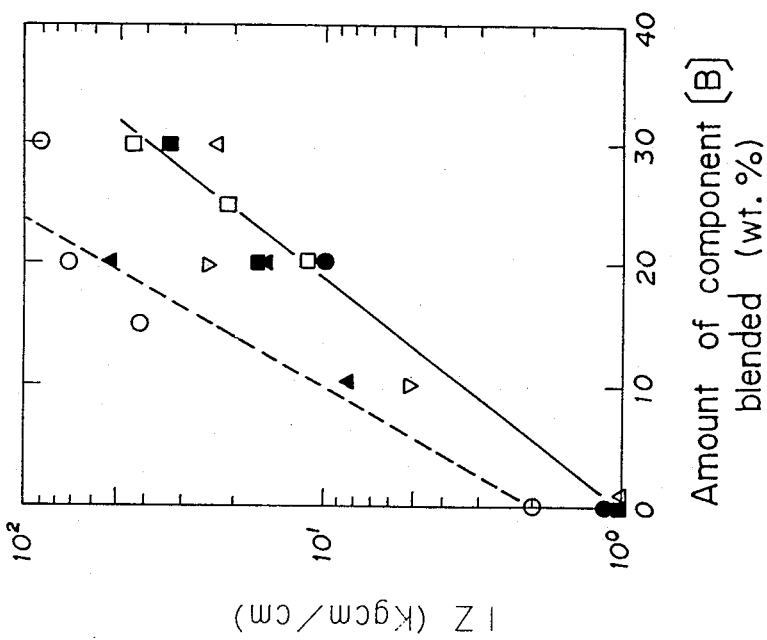

CYCLOOLEFIN TYPE RANDOM COPOLYMER COMPOSITIONS

FIELD OF THE INVENTION

This invention relates to cycloolefin type random copolymer compositions which are excellent in heat resistance, heat ageing characteristics, chemical resistance, solvent resistance, dielectric characteristics and rigidity as well as in impact resistance.

BACKGROUND OF THE INVENTION

Known as synthetic resins having well-balanced properties between rigidity and impact strength are polycarbonates, ABS (acrylonitrile-butadiene-styrene compositions), etc. For instance, polycarbonates are resins which are excellent in rigidity as well as in heat resistance, heat ageing characteristics and impact strength. However, polycarbonates involve such a problem that they are poor in chemical resistance as they are easily attacked by strong alkali. Further, they have high water absorption. Though ABS are excellent in mechanical properties, they have such problems that they are poor in chemical resistance and further, because of double bonds in their molecular structure they are poor in weather resistance and heat resistance.

On one hand, polyolefins which are widely used as general-purpose resins are excellent in chemical resistance and solvent resistance. However, many of polyolefins are poor in heat resistance, insufficient in crystallizability and poor in rigidity. In general, to improve polyolefins in rigidity and heat resistance, there is employed a procedure in which nucleating agents are incorporated into polyolefins to expedite the growth of crystal, or a procedure in which polyolefins are gradually cooled to accelerate the growth of crystal. However, it is hard to say that the alleged effects obtained by these procedures are sufficient. The procedure of incorporating into polyolefins a third component such as nucleating agents rather involves the risk of marring various excellent properties inherent in polyolefins, and the gradually cooling procedure is low in production efficiency and involves the risk of lowering impact strength as the non-crystalline part of polyolefins decreases.

A copolymer of ethylene and 2,3-dihydroxydicyclopentadiene has been disclosed as an example of copolymers of ethylene and bulky comonomers, for example, in U.S. Pat. No. 2,883,372. However, this copolymer is poor in heat resistance as it has a glass transition temperature in the vicinity of 100° C., though said copolymer is well balanced between rigidity and transparency. Similar drawback is also observed in copolymers of ethylene and 5-ethylidene-2-norbornene.

Japanese Patent Publn. No. 14910/1971 proposes a homopolymer of 1,4,5,8-dimethano-1,2,3,4,4a,5,8,8a-octahydronaphthalene. The proposed polymer, however, is poor in heat resistance and heat ageing characteristics. Japanese Patent L-O-P Publn. No. 127728/1983 further proposes a homopolymer of 1,4,5,8-dimethano-1,2,3,4,4a,5,8,8a-octahydronaphthalene or copolymers of said cycloolefin and norbornene type comonomers, which are apparently those obtained by ring opening polymerization (ring opening polymers) in light of the disclosure in said publication. These ring opening polymers which have unsaturated bonds in the polymer main chains, however, have such a drawback that they are poor in heat resistance and heat ageing characteristics.

In the course of these researches, we found that cycloolefin type random copolymers of ethylene and bulky cycloolefins are synthetic resins which are excellent in heat resistance as well as in heat ageing characteristics, chemical resistance, solvent resistance, dielectric characteristics and rigidity. On the basis of the above findings, we have already made various technical proposals as disclosed in Japanese Patent L-O-P Publn. No. 168708/1985 and Japanese Patent Appln. Nos. 220550/1984, 236828/1984, 236829/1984, 242336/1984 and 95906/1986. In spite of their being olefin type polymers, the cycloolefin type random copolymers as proposed are excellent in heat resistance and rigidity. However, they involve such problems that they are brittle and poor in impact resistance.

We have made studies to improve the rigidity and impact resistance of cycloolefin type random copolymers without detriment to their excellent heat resistance, heat ageing characteristics, chemical resistance, solvent resistance and dielectric characteristics. As a result, we have found that compositions consisting of a cycloolefin type random copolymer having a specific softening temperature (TMA) and at least one specific non-rigid copolymer or compositions obtained by blending inorganic filler and/or organic filler with said composition consisting of said random copolymer and said non-rigid copolymer have the above-described excellent characteristics. This invention has been performed on the basis of the above findings.

OBJECT OF THE INVENTION

The present invention is intended to solve such problems associated with the prior art as mentioned above and an object of the invention is to provide cycloolefin type random copolymer compositions which are excellent in heat resistance, heat ageing characteristics, solvent resistance and dielectric characteristics as well as in rigidity and impact resistance.

DISCLOSURE OF THE INVENTION

The first cycloolefin type random copolymer compositions of the present invention are characterized by comprising (A) a cycloolefin type random copolymer containing an ethylene component and a cycloolefin component represented by the following general formula [I] or [II] and having an intrinsic viscosity [η] of 0.05–10 dl/g as measured at 135° C. in decalin and a softening temperature (TMA) of not lower than 70° C., and (B) one or more non-rigid copolymers selected from the group consisting of:
  (i) a cycloolefin type random copolymer containing an ethylene component, at least one other α-olefin component and a cycloolefin component represented by the following general formula [I] or [II] and having an intrinsic viscosity [η] of 0.01–10 dl/g as measured at 135° C. in decalin and a softening temperature (TMA) of below 70° C.,
  (ii) a non-crystalline to low crystalline α-olefin type elastomeric copolymer formed from at least two α-olefins,
  (iii) an α-olefin-diene type elastomeric copolymer formed from at least two α-olefins and at least one non-conjugated diene, and (iv) an aromatic vinyl type hydrocarbon-conjugated diene copolymer or a hydrogenated product thereof, the total amount of said (B) component being 5 to 100 parts by weight based on 100 parts by weight of said (A) component.

The second cycloolefin type random copolymer compositions are characterized by comprising (A) a cycloolefin type random copolymer containing an ethylene component and a cycloolefin component represented by the following general formula [I] or [II] and having an intrinsic viscosity [$\eta$] of 0.05–10 dl/g as measured at 135° C. in decalin and a softening temperature (TMA) of not lower than 70° C., (B) one or more non-rigid copolymers selected from the group consisting of:
  (i) a cycloolefin type random copolymer containing an ethylene component, at least one other $\alpha$-olefin component and a cycloolefin component represented by the following general formula [I] or [II] and having an intrinsic viscosity [$\eta$] of 0.01–10 dl/g as measured at 135° C. in decalin and a softening temperature (TMA) of below 70° C.,
  (ii) a non-crystalline to low crystalline $\alpha$-olefin type elastomeric copolymer formed from at least two $\alpha$-olefins,
  (iii) an $\alpha$-olefin-diene type elastomeric copolymer formed from at least two $\alpha$-olefins and at least one non-conjugated diene, and
  (iv) an aromatic vinyl type hydrocarbon-conjugated diene copolymer or a hydrogenated product thereof, and (C) an inorganic filler component or an organic filler component, the total amount of said (B) component being 1 to 100 parts by weight based on 100 parts by weight of said (A) component and the amount of said (C) component being 1 to 100 parts by weight based on 100 parts by weight of said (A) component.

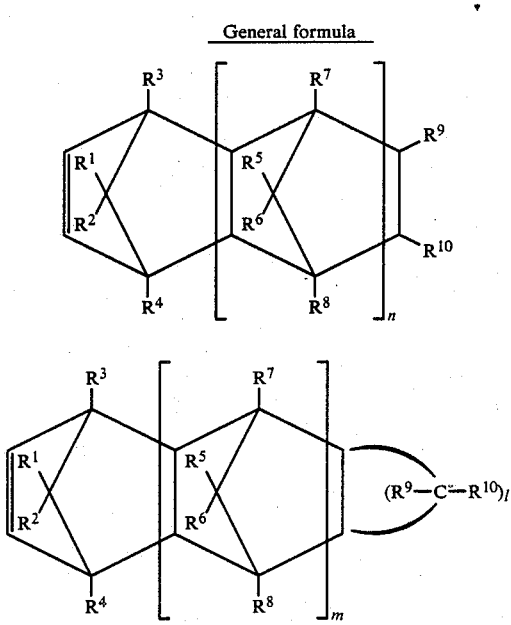

General formula wherein n and m are each 0 or a positive integer, l is an integer of at least 3, and $R^1$ to $R^{10}$ each represent hydrogen atom, halogen atom or hydrocarbon group.

The first cycloolefin type random copolymer compositions of the present invention comprise said (A) component and said (B) component in a proportion of 5–100 parts by weight of said (B) component per 100 parts by weight of said (A) component so that they are excellent in heat resistance, heat ageing characteristics, chemical resistance, solvent resistance, dielectric characteristics and rigidity as well as in impact resistance.

The second cycloolefin type random copolymer compositions of the present invention comprise said (A) component, said (B) component and said (C) component in proportions of 1–100 parts by weight of said (B) component and 1–100 parts by weight of said (C) component per 100 parts by weight of said (A) composition so that they are excellent in heat resistance, heat ageing characteristics, chemical resistance, solvent resistance and dielectric characteristics as well as in impact resistance.

BRIEF DESCRIPTION OF THE DRAWINGS

FIG. 1 is a graph showing the relationship between the amount of the cycloolefin type random copolymer [B](i) to be blended in the cycloolefin type random copolymer composition of the invention and the impact strength (IZ strength) of said composition.

FIG. 2 is a graph showing the relationship between the amount of the cycloolefin random copolymer [B](i) blended in the cycloolefin type random copolymer composition of the invention and the softening temperature (TMA) of said composition.

DETAILED DESCRIPTION OF THE INVENTION

Figure 4:
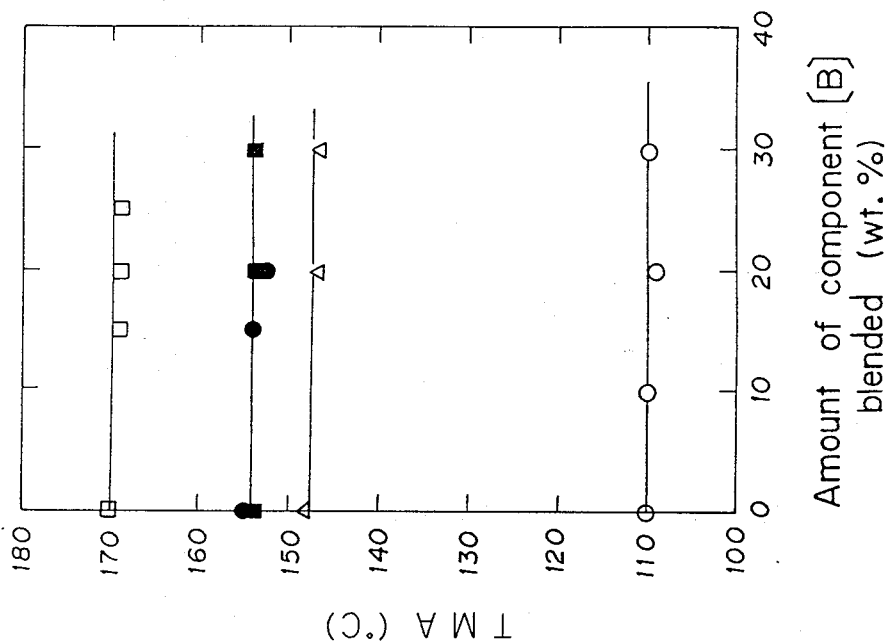
FIG. 4 is a graph showing the relationship between the amount of the $\alpha$-olefin type random copolymer [B](ii) blended in the cycloolefin type random copolymer composition of the invention and the softening temperature (TMA) of said composition.

The cycloolefin type random copolymer compositions of the present invention are illustrated below in detail.

In accordance with the present invention, there are provided cycloolefin type random copolymer compositions characterized by comprising (A) a cycloolefin type random copolymer containing an ethylene component and a cycloolefin component represented by the following general formula [I] or [II] and having an intrinsic viscosity [η] of 0.01–10 dl/g as measured at 135° C. in decalin and a softening temperature (TMA) of not lower than 70° C., and (B) one or more non-rigid copolymers selected from the group consisting of:

(i) a cycloolefin type random copolymer containing an ethylene component, at least one other α-olefin component and a cycloolefin component represented by the following general formula [I] or [II] and having an intrinsic viscosity [η] of 0.01–10 dl/g as measured at 135° C. in decalin and a softening temperature (TMA) of below 70° C., (ii) a non-crystalline to low crystalline α-olefin type elastomeric copolymer formed from at least two α-olefins, (iii) an α-olefin-diene type elastomeric copolymer formed from at least two α-olefins and at least one non-conjugated diene, and (iv) an aromatic vinyl type hydrocarbon-conjugated diene copolymer or a hydrogenated product thereof, the total amount of said (B) component being 5 to 100 parts by weight based on 100 parts by weight of said (A) component.

General formula

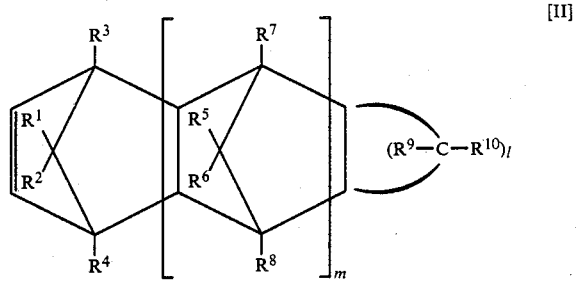

[I]

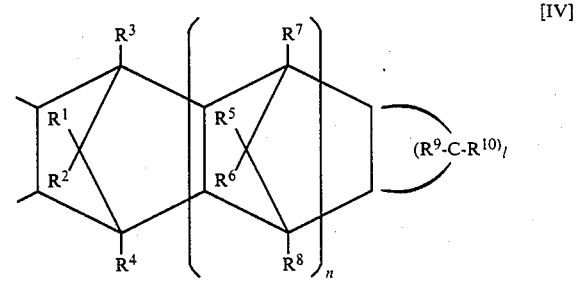

[II]

wherein n and m are each 0 or a positive integer, l is an integer of at least 3, and $R^1$ to $R^{10}$ each represent hydrogen atom, halogen atom or hydrocarbon group.

The cycloolefin type random copolymer [A] and [B](i) which constitute the cycloolefin type random copolymer compositions of the present invention are cycloolefin type random copolymers containing an ethylene component and a specific cycloolefin component. The said cycloolefin component is a cycloolefin component represented by the following general formula [I] or [II], and in the cycloolefin type random copolymers, said cycloolefin component forms a structure represented by the general formula [III] or [IV].

General formula

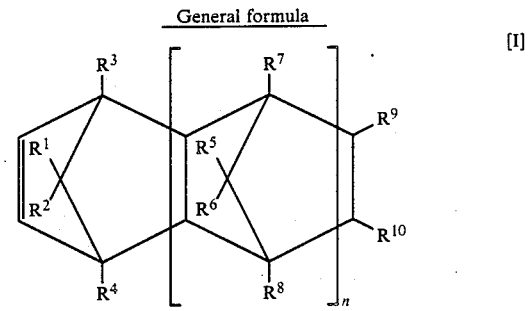

[I]

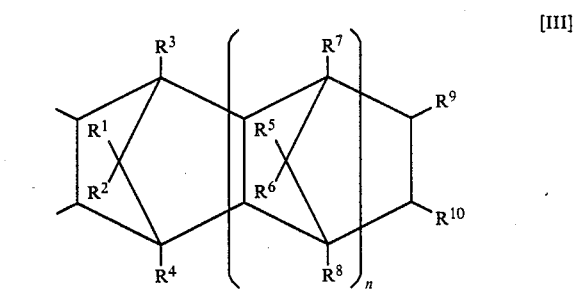

[II]

wherein n and m are each 0 or a positive integer, l is an integer of at least 3, and $R^1$ to $R^{10}$ each represent hydrogen atom, halogen atom or hydrocarbon group.

[III]

[IV]

wherein n, m, l and $R^1$ to $R^{10}$ are as defined above.

The cycloolefin, i.e. a constituent component of the cycloolefin type random copolymer as one component in the cycloolefin type copolymer composition of the present invention is at least one cycloolefin selected from the group consisting of unsaturated monomers represented by the general formulas [I] and [II]. The cycloolefins represented by the general formula [I] can be easily prepared by condensation of cyclopentadienes with appropriate olefins by Diels-Alder reaction. Similarly, the cycloolefins represented by the general formula [II] can be easily prepared by condensation of cyclopentadienes with appropriate cycloolefins by Diels-Alder reaction.

The cycloolefins represented by the general formula [I] in the concrete are such compounds as exemplified in Table 1, or in addition to 1,4,5,8-dimethano-1,2,3,4,4a,5,8,8a-octahydronaphthalene, such octahydronaphthalenes as 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,8,8a-octahydronaphthalene, 2-hexyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-cyclohexyl-1,4,5,8,dimethano-1,2,3,4,4a,5,8,8a-octahydronaphthalene, 2-n-butyl-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, etc. and such compounds as exemplified in Table 2.

TABLE 1

| Chemical formula | Compound name |
|---|---|
| (structure) | Bicyclo[2,2,1]hept-2-ene |
| (structure with CH$_3$) | 6-Methylbicyclo[2,2,1]hept-2-ene |
| (structure with two CH$_3$) | 5,6-Dimethylbicyclo[2,2,1]hept-2-ene |
| (structure with CH$_3$) | 1-Methylbicyclo[2,2,1]hept-2-ene |
| (structure with C$_2$H$_5$) | 6-Ethylbicyclo[2,2,1]hept-2-ene |
| (structure with nC$_4$H$_9$) | 6-n-Butylbicyclo[2,2,1]hept-2-ene |
| (structure with iC$_4$H$_9$) | 6-Isobutylbicyclo[2,2,1]hept-2-ene |
| (structure with CH$_3$) | 7-Methylbicyclo[2,2,1]hept-2-ene |

TABLE 2

| Chemical formula | Compound name |
|---|---|
| (structure with CH$_3$ groups) | 5,10-Dimethyltetracyclo-[4,4,0,1$^{2.5}$,1$^{7.10}$]-3-dodecene |
| (structure with CH$_3$ groups) | 2,10-Dimethyltetracyclo-[4,4,0,1$^{2.5}$,1$^{7.10}$]-3-dodecene |
| (structure with CH$_3$ groups) | 11,12-Dimethyltetracyclo-[4,4,0,1$^{2.5}$,1$^{7.10}$]-3-dodecene |

TABLE 2-continued

| Chemical formula | Compound name |
|---|---|
| (structure) | 2,7,9-Trimethyltetracyclo-[4,4,0,1$^{2.5}$,1$^{7.10}$]-3-dodecene |
| (structure) | 9-Ethyl-2,7-dimethyltetracyclo-[4,4,0,1$^{2.5}$,1$^{7.10}$]-3-dodecene |
| (structure) | 3-Isobutyl-2,7-dimethyltetracyclo-[4,4,0,1$^{2.5}$,1$^{7.10}$]-3-dodecene |
| (structure) | 9,11,12-trimethyltetracyclo-[4,4,0,1$^{2.5}$,1$^{7.10}$]-3-dodecene |
| (structure) | 9-Ethyl-11,12-dimethyltetracyclo-[4,4,0,1$^{2.5}$,1$^{7.10}$]-3-dodecene |
| (structure) | 9-Isobutyl-11,12-dimethyltetracyclo[4,4,0,1$^{2.5}$,1$^{7.10}$]-3-dodecene |
| (structure) | 5,8,9,10-Itramethyltetracyclo-[4,4,0,1$^{2.5}$,1$^{7.10}$]-3-dodecene |
| (structure, numbered 1-14) | Hexacyclo[6,6,1,1$^{3.6}$,1$^{10.13}$,0$^{2.7}$,0$^{9.14}$]-4-heptadecene |
| (structure) | 12-Methylhexacyclo[6,6,1,1$^{3.6}$,1$^{10.13}$,0$^{2.7}$,0$^{9.14}$]-4-heptadecene |
| (structure) | 12-Ethylhexacyclo[6,6,1,1$^{3.6}$,1$^{10.13}$,0$^{2.7}$,0$^{9.14}$]-4-heptadecene |
| (structure) | 12-Isobutylhexacyclo[6,6,1,1$^{3.6}$,1$^{10.13}$,0$^{2.7}$,0$^{9.14}$]-4-heptadecene |
| (structure) | 1,6,10-Trimethyl-12-isobutyl-hexacyclo[6,6,1,1$^{3.6}$,1$^{10.13}$,0$^{2.7}$,0$^{9.14}$]-4-heptadecene |

TABLE 2-continued

| Chemical formula | Compound name |
|---|---|
| | Octacyclo[8,8,0,1$^{2.9}$,1$^{4.7}$,1$^{11.18}$, 1$^{13.16}$,0$^{3.8}$,0$^{12.17}$]-5-docosene |
| | 15-Methyloctacyclo[8,8,0,1$^{2.9}$, 1$^{4.7}$,1$^{11.18}$,1$^{13.16}$,0$^{3.8}$,0$^{12.17}$]-5-docosene |
| | 15-Ethyloctacyclo[8,8,0,1$^{2.9}$,1$^{4.7}$, 1$^{11.18}$,1$^{13.16}$,0$^{3.8}$,0$^{12.17}$]-5-docosene |

The cycloolefins represented by the general formula [II] in the concrete are such compounds as exemplified in Tables 3 and 4.

TABLE 3

| Chemical formula | Compound name |
|---|---|
| | 1,3-Dimethylpentacyclo[6,6,1, 1$^{3.6}$,0$^{2.7}$,0$^{9.14}$]-4-hexadecene |
| | 1,6-Dimethylpentacyclo[6,6,1,1$^{3.6}$, 0$^{2.7}$,0$^{9.14}$]-4-hexadecene |
| | 15,16-Dimethylpentacyclo[6,6,1, 1$^{3.6}$,0$^{2.7}$,0$^{9.14}$]-4-hexadecene |
| | Pentacyclo[6,5,1,1$^{3.6}$,0$^{2.7}$,0$^{9.13}$]-4-pentadecene |
| | 1,3-Dimethylpentacyclo[6,5,1,1$^{3.6}$, 0$^{2.7}$,0$^{9.13}$]-4-pentadecene |
| | 1,6-Dimethylpentacyclo[6,5,1, 1$^{3.6}$,0$^{2.7}$,0$^{9.13}$]-4-pentadecene |
| | 14,15-Dimethylpentacyclo[6,5,1, 1$^{3.6}$,0$^{2.7}$,0$^{9.13}$]-4-pentadecene |

TABLE 3-continued

| Chemical formula | Compound name |
|---|---|
| (structure) | Pentacyclo[6,6,1,1$^{3.6}$,0$^{2.7}$,0$^{9.14}$]-4-hexadecene |
| (structure) | Heptacyclo[8,7,0,1$^{2.9}$,1$^{4.7}$,1$^{11.17}$,0$^{3.8}$,0$^{12.16}$]-5-eicosene |
| (structure) | Heptacyclo[8,8,0,1$^{2.9,2.9}$,1$^{4.7}$,1$^{11.18}$,0$^{3.8}$,0$^{12.17}$]-5-heneicosene |

TABLE 4

| Chemical formula | Compound name |
|---|---|
| (structure) | Tricyclo[4,3,0,1$^{2.5}$]-3-decene |
| (structure with CH$_3$) | 2-Methyl-tricyclo[4,3,0,1$^{2.5}$]-3-decene |
| (structure with CH$_3$) | 5-Methyl-tricyclo[4,3,0,1$^{2.5}$]-3-decene |
| (structure) | Tricyclo[4,4,0,1$^{2.5}$]-3-undecene |
| (structure with CH$_3$) | 10-Methyl-tricyclo[4,4,0,1$^{2.5}$]-3-undecene |

The cycloolefin type random copolymer [A] as one component in the cycloolefin type random copolymer composition of the present invention contains as essential components an ethylene component and the aforementioned cycloolefin component as described above. In addition to said two essential components, however, the cycloolefin type random copolymer [A] may optionally contain other copolymerizable unsaturated monomer components in such a range that they do not hinder the object of the present invention. Such unsaturated monomers which may optionally be copolymerized in the concrete are α-olefins of 3 to 20 carbon atoms, such as propylene, 1-butene, 4-methyl-1-pentene, 1-hexene, 1-octene, 1-decene, 1-dodecene, 1-tetradecene, 1-hexadecene, 1-octadecene, 1-eicosene, etc. in the range of less than an equimolar amount of the ethylene ccomponent in the resulting random copolymer.

In the cycloolefin type random copolymer [A], repeating units (a) derived from etrhylene are present in the range of 40 to 85 mol %, preferably 50 to 75 mol %, and repeating units (b) derived from the cycloolefin or cycloolefin are present is in the range of 15 to 60 mol %, preferably 25 to 50 mol %. The repeating units (a) are arranged substantially linear by and at random. That the cycloolefin type random copolymers [A] are sunstantially linear and do not contain a gel-forming cross-linked structure can be confirmed by the fact that said copolymers perfectly dissolve in decalin kept at 135° C.

An intrinsic viscosity [η] as measured at 135° C. in decalin of the cycloolefin type random copolymer [A] is in the range of 0.05-10 dl/g, preferably 0.08-5 dl/g.

A softening temperature (TMA) as measured with a thermal mechanical analyzer of the cycloolefin type random copolymer [A] is not lower than 70° C., preferably in the range of 90°-250° C., more preferably 100°-200° C. Furthermore, a glass transition temperature (Tg) of said cycloolefin type random copolymer [A] is usually in the range of 50°-230° C., preferably 70°-210° C.

A crystallinity index as measured by X-ray diffractometry of the cycloolefin type random copolymer [A] is in the range of 0-10%, preferably 0-7%, more preferably 0-5%.

The cycloolefin type random copolymer [B] (i), which can be one component in the cycloolefin type random copolymer compositions of the present invention, contains as essential components an ethylene component and the aforementioned cycloolefin component and further must contain in addition to said two essential components at least one other copolymerizable unsaturated monomer component as an esstial component. Such at least one unsaturated monomer which must be copolymerized in the concrete includes α-olefins of 3 to 20 carbon atoms such as propylene, 1-butene, 4-methyl-1-pentene, 1-hexene, 1-octene, 1-dodecene, 1-tetradecene, 1-hexadecene, 1-octadecene, 1-eicosane, etc. in the range of less than an equimolar amount of the ethylene component unit in the resulting random copolymer.

In the cycloolefin type random copolymer [B] (i), there are present repeating units (a) derived from ethylene in the range of 40 to 99 mol %, preferably 75 to 98 mol %, repeating units (b) derived from the cycloolefin(s) in the range of 1 to 40 mol %, preferably 1 to 15 mol %, and repeating units (c) derived from at least one α-olefin other than ethylene in the range of 1 to 45 mol %, preferably 1 to 35 mol %, and the repeating unit (a), (b) and (c) are arranged substantially line alloy and at random. That the cycloolefin type random copolymers [B] (i) are substantially linear and do not contain a gel-forming cross-linked structure can be confirmed by the fact that said copolymers perfectly dissolve in decalin kept at 135° C.

The α-olefin elastomeric copolymers [B] (ii) as one component in the cycloolefin type random copolymers of the present invention are non-crystalline to low crystalline copolymers formed from at least two α-olefins. There are used in the concrete (i) ethylene-α-olefins copolymer rubber and (ii) propylene-α-olefin copolymer rubber as said component [B] (ii). Examples of the α-olefins which constitute said (i) ethylene α-olefin copolymer rubber are usually α-olefins of 3 to 20 carbons, such as propylene, 1-butene, 1-pentene, 1-hexene, 4-methyl-1-pentene, 1-octene, 1-decene or mixtures thereof. Amoung them, propylene or 1-butene is particularly preferred.

Examples of the α-olefines which constitute said (ii) propylene-α-olefin copolymer rubber are usually α-olefins of 4 to 20 carbon atoms such as 1-butene, 1-pentene, 1-hexene, 4-methyl-1-pentene, 1-octene, 1-decene or mixtures thereof. Among them, 1-butene is particularly preferred.

The molar ratio of ethylene to α-olefin in the (i) ethylene-α-olefin copolymer rubber varies depending on the types of the α-olefins, but is generally in the range of from 30/70 to 95/5, preferably from 50/50 to 95/5. When the α-olefin is propylene, said molar ratio is preferably in the range of from 50/50 to 90/10, while when the α-olefins are those of four or more carbon atoms, said molar ratio is preferably in the range of from 80/20 to 95/5.

The molar ratio of propylene to α-olefin in the (ii) propylene-α-olefin copolymers rubber varies depending on the types of the α-olefins, but is preferably in the range of from 50/50 to 95/5. When the α-olefin is 1-butene, said molar ratio is preferably in the range of from 50/50 to 90/10, while when the α-olefins are those of five or more carbon atoms, said molar ratio is preferably in the range of from 80/20 to 95/5.

A crystallinity index as measured by X-ray diffractometry of the α-olefin type elastomeric copolymer [B] (ii) is preferably in the range of 0–50%, more preferably 0–25%.

An intrinsic viscosity [η] as measured at 135° C. in decalin of the α-olefin type elastomeric copolymer [B] (ii) is in the range of 0.2–10 dl/g, preferably 1–5 dl/g as measured at 135° C. in decalin. The density thereof is preferably in the range of 0.82–0.96 g/cm$^3$, more preferably 0.84–0.92 g/cm$^3$.

The α-olefin type elastomeric copolymers [B] (ii) which are used in the present invention may be graft-modified copolymers which are modified with 0.01 to 5% by weight, preferably 0.1 to 4% by weight of graft monomers selected from unsaturated carboxylic acids or derivatives thereof.

Examples of the unsaturated carboxylic acids and derivatives thereof which are used for modification of the α-olefin type elastomeric copolymers [B] (ii) in the present invention include such unsaturated carboxylic acids as acrylic acid, maleic acid, fumaric acid, tetrahydrophthalic acid, itaconic acid, citraconic acid, crotonic acid, isocrotonic acid, nadic acid® (endocisbicyclo[2,2,1]hept-5-ene-2,3-dicarboxylic acid), etc. and derivatives thereof such as acid halides, amides, imides, anhydrides, esters, etc. Concrete examples of said derivatives include malenyl chloride, maleimide, maleic anhydride, citraconic anhydride, monomethyl maleate, dimethyl maleate, glycidyl maleate, etc. Among them, unsaturated dicarboxylic acids or acids or acid anhydrides thereof are preferred and maleic acid, nadic acid® and anhydrides thereof are particularly preferred.

The modified α-olefin type elastomeric copolymers can be produced by graft-copolymerizing a graft monomer selected from said unsaturated carboxylic acids and said derivatives onto the α-olefin type elastomeric copolymer [B] (ii) by any of various conventional methods. For example, the modified α-olefin type elastomeric copolymers can be produced by a method wherein said α-olefin type elastomeric copolymer is molten, a graft monomer is added thereto and a graft polymerization reaction is carried out, or a method wherein said α-olefin type elastomeric copolymer is dissolved in a solvent, a graft monomer is added thereto and a graft copolymerization reaction is carried out. In either case, it is preferred to carry out the graft reaction in the presence of a radical initiator to graft-copolymerize efficiently the graft monomer. The graft reaction is usually carried out at a temperature of 60° to 350° C. The amount of the radical initiator to be used is generally in the range of 0.001 to 1 part by weight based on 100 parts by weight of the ethylene-α-olefin random copolymer.

Examples of the radical initiator include organic peroxides and organic persesters such as benzoyyl peroxide, dichlorobenzoyl peroxide, dicumyl peroxide, di-tert-butyl peroxide, 2,5-dimethyl-2,5-di (peroxide benzoate) hexine-3, 1,4-bis(tert-burtyl peroxyisopropyl)-benzene, lauroyl peroxide, tert-butyl peracetate, 2,5-dimethyl-2,5-di(tert-butylperoxy)hexine-2, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate; and azo compounds such as azobisisbutyronitrile, dimethyl azoisobutyrate, etc. Among them, dialkyl peroxides such as dicumyl peroxide, di-tert-butyl peroxide, 2,5-dimethyl-2,5-di(tert-butylperoxy) hexine-3, 2,5-dimethyl-2,5-di(tert-butylperoxy)hexane, 1,4-bis (tert-butylperoxyisopropyl)benzene, etc. are preferred.

Among said α-olefin type elastomeric copolymers [B] (ii), graft-modified copolymers obtained by modifying ethylene-propylene random copolymers or ethylen -α-olefin random copolymers having an ethylene content of 35 to 50 mol% and a crystallinity index of not higher than 5% with a graft monomers selected from said unsaturated carboxylic acids and derivatives thereoof are the most preferred, because they exhibit the best effect of improving impact resistance.

The α-olefin-diene type elastomeric copolymers [B] (iii) as one component in the cycloolefin type copolymers compositions of the present invention are copolymers of at least two olefins and at least one non-conjugated diene. There are concretely used (i) ethylene-α-olefin-diene copolymer rubber and (ii) propylene-α-olefin-diene copolymer rubber as said component [B] (iii).

The α-olefins which constitute the (i) ethylene-α-olefin-diene copolymer rubber are usually those of 3 to 20 carbon atoms such as propylene, 1-butene, 1-pentene, 1-hexene, 4methyl-1-pentene, 1-octene, 1-decene or mixtures thereof. Among them, propylene or 1-butene is preferred.

The α-olefins which consititute the (ii) propylene-αolefin-diene copolymer rubber are usually those of 4 to 20 carbon atoms such as 1-butene, 1-pentene, 1-hexene, 4-methyl-1-pentene, 1-octene, 1-decene or mixtures thereof. Among them, 1-butene is particularly preferred.

Examples of the dience components for the (i) ethyleneα-olefin-iene copolymer rubber or the (ii) propylene-α-olefin-diene copolymer rubber include linear non-conjugated dienes such as 1,4-hexadiene, 1,6-octadiene, 2-methyl-1,5-hexandiene, 6-methyl-1,5-heptadiene 7-methyl-1,6-octadiene, etc.; cyclic non-conjugated dienes such as cyclohexadiene, dicyclopentadiene, methylterahydroindene, 5-vinylnorbornene, 5-ethylidene-2-norbornene, 5-methylene-2-norbornene, 5-isopropyldiene-2-norbornene, 6-chloromethyl-5-isopropenyl,-2-norbornenes, 2,3-diisopropylidene-5-norbornene, 2-ethylidene-3-isopropylidiene-5-norbornene, 2-propenyl-2,2-norbornadiene, etc. Among them, 1,4hexadiene and cyclic non-conjuted dienes, particularly, dicyclopentadiene or 5-ethylidene-2- norbornene, 5-vinyl-2-norbornene, '5-methylene-2-norbornene, 1,4-hexadiene and 1,4 -octadiene are preferred.

The molar ratio of ethylene to α-olefin in the (i) ethylene-α-olefin-diene copolymer rubber varies depending on the types of the α-olefins, but is preferably in the range of from 50/50 to 95/5. When the αolefin is propylene, said molar ratio is preferably in the range of from 50/50 to 90/10, while when the α-olefins are those of four or more carbon atoms, said molar is preferably in the range of from 80/20 to 95/5.

The content of the diene component in the copolymer rubber is in the range of 0.5 to 10 mol %, preferably 0.5 to 5 mol %.

The molar ratio of propylene to α-olefin in the (ii) propylene-α-olefin-diene copolymer rubber varies depending on the types of the α-olefins, but is preferably in the range of from 50/50 to 95/5. When the α-olefin is 1-butene, said molar ratio is preferably in the range of from 50/50 to 90/10, while when the α-olefins are those of five or more carbon atoms, said molar ratio is preferably in the range of from 80/20 to 95/5.

The content of the diene component in the copolymer rubber is in the range of 0.5 to 10 mol %, preferably 0.5 to 5 mol %.

A crystallinity index as measured by X-ray diffractometry of the α-olefin-diene type elastomeric copolymer [B](iii) is preferably in the range of 0–10%, more preferably 0–5%.

An intrinsic viscosity [η] as measured at 135° C. in decalin of the α-olefin-diene type elastomeric copolymers [B](iii) is in the range of 0.1–10 dl/g, preferably 1–5 dl/g. The iodine value thereof is in the range of 1–30, preferably 5–25, and the density thereof is in the range of 0.82–1.00 g/cm$^3$, preferably 0.85–0.90 g/cm$^3$.

The aromatic vinyl type hydrocarbon-conjugated diene copolymers or hydrogenated products thereof [B](iv) as one component in the cycloolefin type random copolymer compositions of the present invention are concretely (a) styrene-butadiene copolymer rubbers, (b) styrene-butadiene-styrene copolymer rubbers, (c) styrene-isoprene block copolymer rubbers, (d) styrene-isoprene-styrene block copolymer rubbers, (e) hydrogenated styrene-butadiene-styrene block copolymer rubbers, (f) hydrogenated styrene-isoprene-styrene block copolymer rubbers, etc. The molar ratio of styrene to butadiene in the (a) styrene-butadiene copolymer rubbers is preferably in the range of from 0/100 to 60/40. The molar ratio of styrene to butadiene in the (b) styrene-butadiene-styrene block copolymer rubbers is preferably in the range of from 0/100 to 60/40 and a degree of polymerization of styrene in each block is preferably in the range of about 0 to 5000 and a degree of polymerization of butadiene in each block is preferably in the range of about 10 to 20000. The molar ratio of styrene to isoprene in the (c) styrene-isoprene block copolymer rubbers is preferably in the range of from 0/100 to 60/40. The molar ratio of styrene to isoprene in the (d) styrene-isoprene-styrene block copolymer rubbers is preferably in the range of from 0/100 to 60/40 and a degree of polymerization of styrene in each block is preferably in the range of about 0 to 5000 and a degree of polymerization of isoprene in each block is preferably in the range of about 10 to 20000. The (e) hydrogenated styrene-butadiene-styrene block copolymer rubbers are copolymer rubbers wherein double bonds left in said styrene-butadiene-styrene block copolymer rubbers are partially hydrogenated and the weight ratio of styrene to rubber moiety is preferably in the range of from 0/100 to 50/50. The (f) hydrogenated styrene-isoprene-styrene block copolymer rubbers are copolymer rubbers wherein double bonds left in said styrene-isoprene-styrene block copolymers are partially hydrogenated and the weight ratio of styrene to rubber moiety is preferably in the range of from 0/100 to 50/50.

A weight-average molecular weight Mw as measured with GPC (gel permeation chromatography, solvent: o-dichlorobenzene, 140° C.) of the aromatic vinyl type hydrocarbon-conjugated diene block copolymer is in the range of 500 to 2000000, preferably 10000 to 1000000, and the density thereof is in the range of 0.80–1.10 g/cm$^3$, preferably 0.88–0.96 g/cm$^3$.

In the present invention, the aforementioned non-rigid copolymers (i) to (iv) are used either alone or in combination of two or more of them and incorporated into the cycloolefin type random copolymer compositions. When said non-rigid copolymers are used in combination, any of the combinations of the non-rigid copolymers (i) to (iv) can be used.

In the cycloolefin type random copolymer compositions of the present invention, the total amount of the non-rigid copolymer (B) used is in the range of 5 to 100 parts by weight, preferably 7 to 80 parts by weight, particularly preferably 10 to 70 parts by weight based on 100 parts by weight of the cycloolefin type random copolymer [A]. When the total amount of the non-rigid copolymer [B] is less than 5 parts by weight based on 100 parts by weight of the cycloolefin type random copolymer [A], the compositions are poor in impact resistance, though they are excellent in rigidity, while when the total amount of the non-rigid copolymer [B] is more than 100 parts by weight, the rigidity of the compositions is low and the balance between rigidity and impact strength becomes poor.

FIG. 1 is a graph showing the relationship between the amount of the cycloolefin type random copolymer [B] blended in the cycloolefin type random copolymer composition of the present invention and the impact strength (IZ strength) of said composition.

It is apparent from FIG. 1 that when the cycloolefin type random copolymer [B] is blended with the cycloolefin type random copolymer [A], the impact resistance of the resulting cycloolefin type random copolymer composition is remarkably improved.

FIG. 2 is a graph showing the relationship between the amount of the cycloolefin type random copolymer [B] blended in the cycloolefin type random copolymer composition of the present invention and the softening temperature (TMA) of said composition.

It is apparent from FIG. 2 that even when up to 30 wt. % of the cycloolefin type random copolymer [B] is blended with the cycloolefin type random copolymer [A], it is surprisingly found that the softening temperature (TMA) of the cycloolefin type random copolymer composition is not lowered at all.

The impact resistance of the cycloolefin type copolymer composition is greatly improved and heat resistance is not lowered, when up to about 30 wt. % of the cycloolefin type random copolymer [B] is blended with the cycloolefin type random copolymer [A].

In FIGS. 1 and 2, the mark o represents values for Examples 1 to 3 and Comparative Example 1, the mark ● represents values for Example 4 and Comparative Example 2, the mark □ represents values for Examples 5 to 7 and Comparative Example 3, the mark ■ represents values for Examples 8 and 9 and Comparative Example 4, the mark Δ represents values for Examples 10 and 11 and Comparative Example 5, the mark ▲ represents values for Examples 12 and 13, and the mark ∇ represents values for Examples 14 and 15 and Comparative Example 6.

Figure 3:
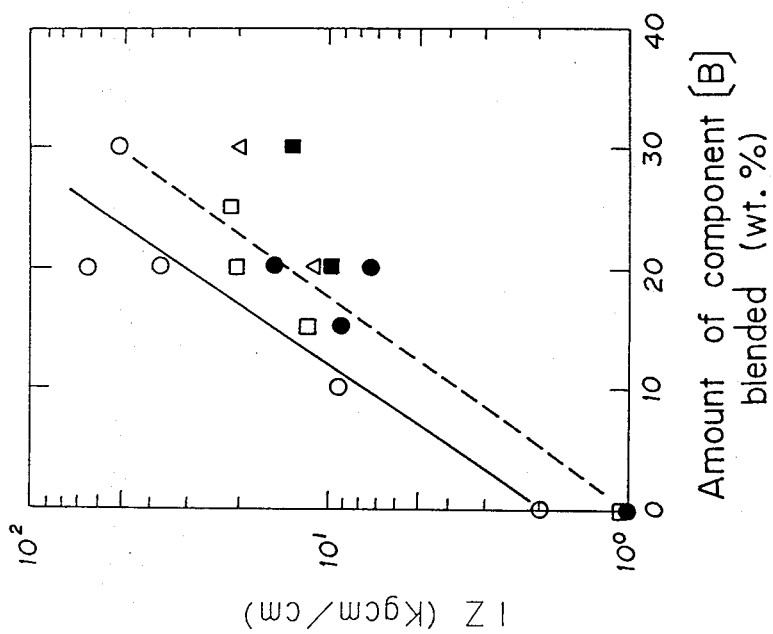
FIG. 3 is a graph showing the relationship between the amount of the $\alpha$-olefin type random copolymer [B](ii) blended in the cycloolefin type random copolymer composition of the invention and the impact strength (IZ strength) of said composition.

FIG. 3 is a graph showing the relationship between the amount of the α-olefin type elastomeric composition [B] blended in the cycloolefin type random copolymer composition and the impact strength (IZ strength) of said composition.

It is apparent from FIG. 3 that the impact strength of the cycloolefin type random copolymer composition is remarkably improved, when the α-olefin type elastomeric copolymer [B] is blended with the cycloolefin type random copolymer [A].

FIG. 4 is a graph showing the relationship between the amount of the α-olefin type elastomeric copolymer [B] blended in the cycloolefin type random copolymer composition and the softening temperature (TMA) of said composition.

It is apparent from FIG. 4 that it is surprisingly found that the softening temperature (TMA) of the cycloolefin type random copolymer composition is scarcely lowered, when up to 30 wt. % of the α-olefin type elastomeric copolymer [B] is blended with the cycloolefin type random copolymer [A].

The impact resistance of the cycloolefin type random copolymer composition is greatly improved and heat resistance is not lowered, when up to about 30 wt. % of the α-olefin type elastomeric copolymer [B] is blended with the cycloolefin type random copolymers [A].

In FIGS. 3 and 4, the mark o represents values for Examples 16 to 20 and Comparative Example 7, the mark □ represents values for Examples 21 to 23 and Comparative Example 8, the mark ● represents values for Examples 26 and 27 and Comparative Example 10, and the mark Δ represents values for Examples 28 and 29 and Comparative Example 11.

Figure 5:
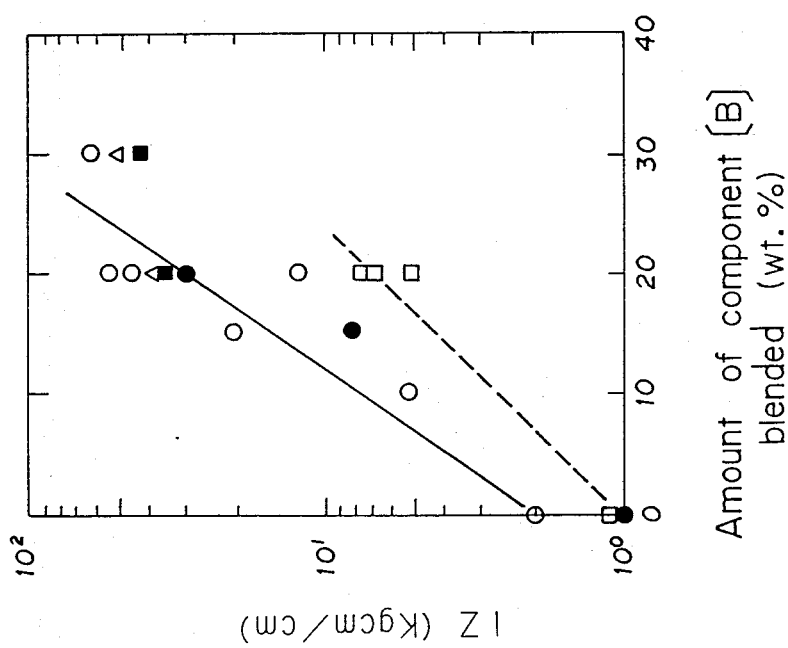
FIG. 5 is a graph showing the relationship between the amount of the $\alpha$-olefin-diene type random copolymer [B](iii) blended in the cycloolefin type random copolymer composition of the invention and the impact strength (IZ strength) of said composition.

FIG. 5 is a graph showing the relationship between the amount of the α-olefin-diene type elastomeric copolymer [B] blended in the cycloolefin type random copolymer composition of the present invention and the impact strength (IZ strength) of said composition.

It is apparent from FIG. 5 that the impact resistance of the resulting cycloolefin type random copolymer composition is remarkably improved, when the olefin-diene type elastomeric copolymer [B] is blended with the cycloolefin type random copolymer [A].

Figure 6:
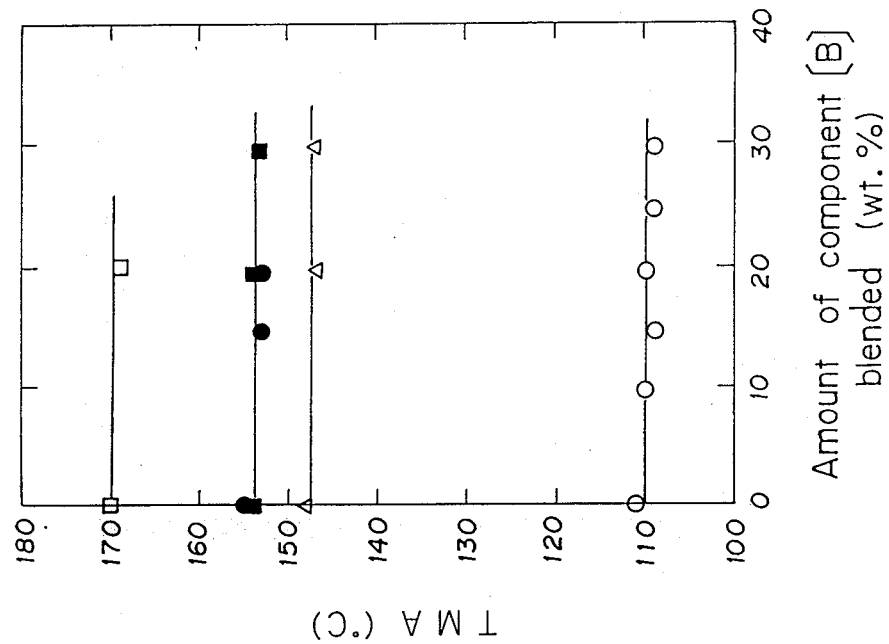
FIG. 6 is a graph showing the relationship between the amount of the $\alpha$-olefin-diene type random copolymer [B](iii) blended in the cycloolefin type random copolymer composition and the softening temperature (TMA) of said composition.

FIG. 6 is a graph showing the relationship between the amount of the α-olefin-diene type elastomeric copolymer [B] blended in the cycloolefin type random copolymer composition of the present invention and the softening temperature (TMA) of said composition.

It is apparent from FIG. 6 that the softening temperature (TMA) of the cycloolefin type random copolymer composition is surprisingly not lowered at all, even when up to about 30 wt. % of the α-olefin-diene type elastomeric copolymer [B] is blended with the cycloolefin type random copolymer [A].

As stated above, the impact resistance of the cycloolefin type random copolymer composition is remarkably improved and heat resistance is not lowered, when up to about 30 wt. % of the α-olefin-diene type elastomeric copolymer [B] is blended with the cycloolefin type random copolymer [A].

In FIGS. 5 and 6, the mark o represents values for Examples 35 to 41 and Comparative Example 13, the mark □ represents values for Examples 42 to 44 and Comparative Example 14, the mark ● represents values for Examples 45 and 46 and Comparative Example 15, the mark ■ represents values for Examples 47 and 48 and Comparative Example 16, and the mark Δ represent values for Examples 49 and 50 and Comparative Example 17.

Figure 7:
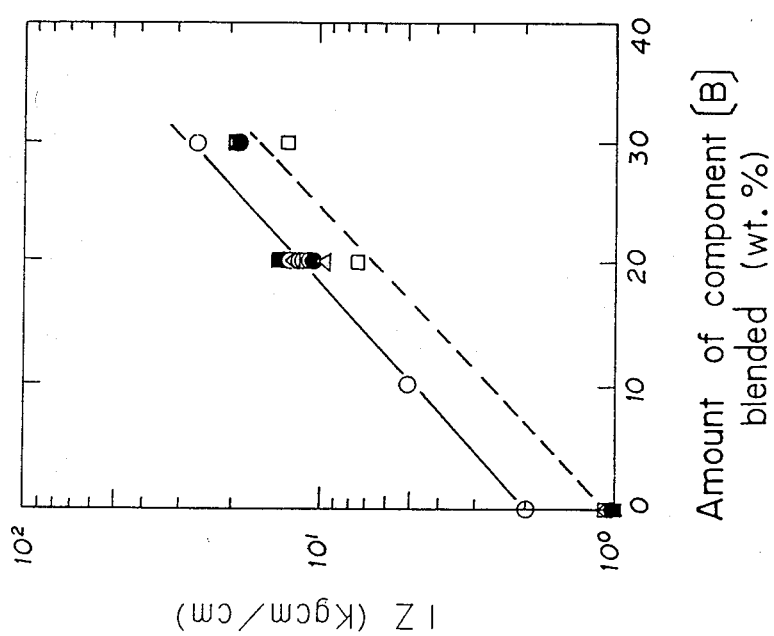
FIG. 7 is a graph showing the relationship between the amount of the aromatic vinyl type hydrocarbon-conjugated diene copolymer or a hydrogenated product thereof blended in the cycloolefin type random copolymer composition of the invention and the impact strength (IZ strength) of said composition.

FIG. 7 is a graph showing the relationship between the amount of the aromatic vinyl type hydrocarbon-conjugated copolymer or hydrogenated product thereof [B] blended in the cycloolefin type random copolymer composition of the present invention and the impact strength (IZ strength) of said composition.

It is apparent from FIG. 7 that the impact resistance of the resulting cycloolefin type random copolymer composition is remarkably improved, when the aromatic vinyl type hydrocarbon-conjugated diene copolymer or a hydrogenated product thereof [B] is blended with the cycloolefin type random copolymer [A].

Figure 8:
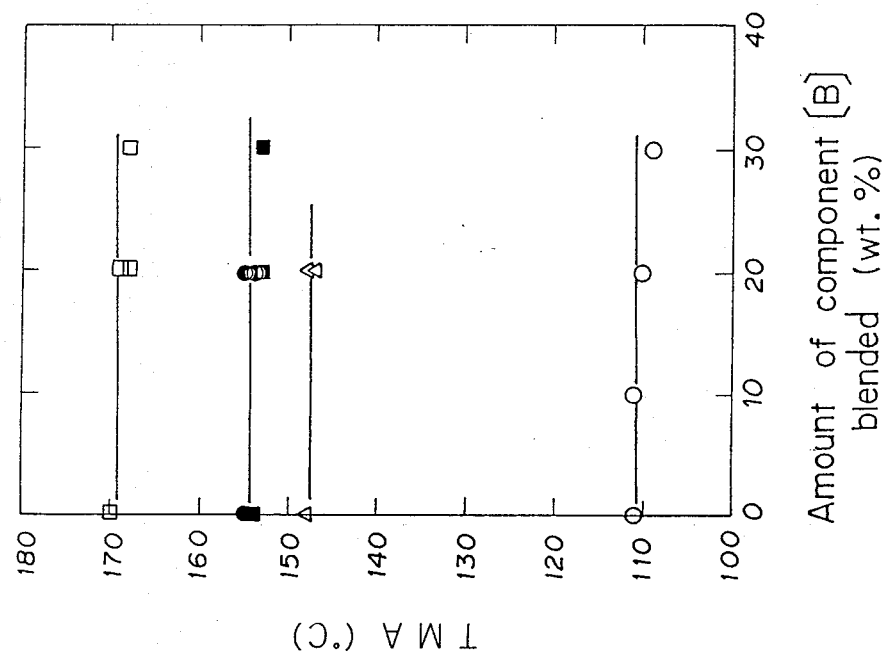
FIG. 8 is a graph showing the relationship between the amount of the aromatic vinyl type hydrocarbon-conjugated diene copolymer or a hydrogenated product thereof blended in the cycloolefin type random copolymer composition of the invention and the softening temperature (TMA) of said composition.

FIG. 8 is a graph showing the relationship between the amount of the aromatic vinyl type hydrocarbon-conjugated diene copolymer or hydrogenated product thereof [B] blended in the cycloolefin type random copolymer composition of the present invention and the softening temperature (TMA) of said composition.

It is apparent from FIG. 8 that the softening temperature (TMA) of the cycloolefin type random copolymer composition is suprisingly not lowered at all, even when up to about 30 wt. % of the aromatic vinyl type hydrocarbon-conjugated diene copolymer or hydrogenated product thereof [B] is blended with the cycloolefin type random copolymer [A].

As stated above, the impact resistance of the cycloolefin type random copolymer composition is remarkably improved and heat resistance is not lowered, when up to about 30 wt. % of the aromatic vinyl type hydrocarbon-conjugated diene copolymer or hydrogenated product thereof [B] is blended with the cycloolefin type random copolymer [A].

In FIGS. 7 and 8, the mark o represents values for Examples 51 to 57 and Comparative Example 18, the mark □ represents values for Examples 58 to 60, the mark ● represents values for Examples 61 and 62 and Comparative Example 20, the mark ■ represents values for Examples 65 and 66 and Comparative Example 21, and the mark Δ represents values for Examples 65 and 66 and Comparative Example 22.

Figure 9:
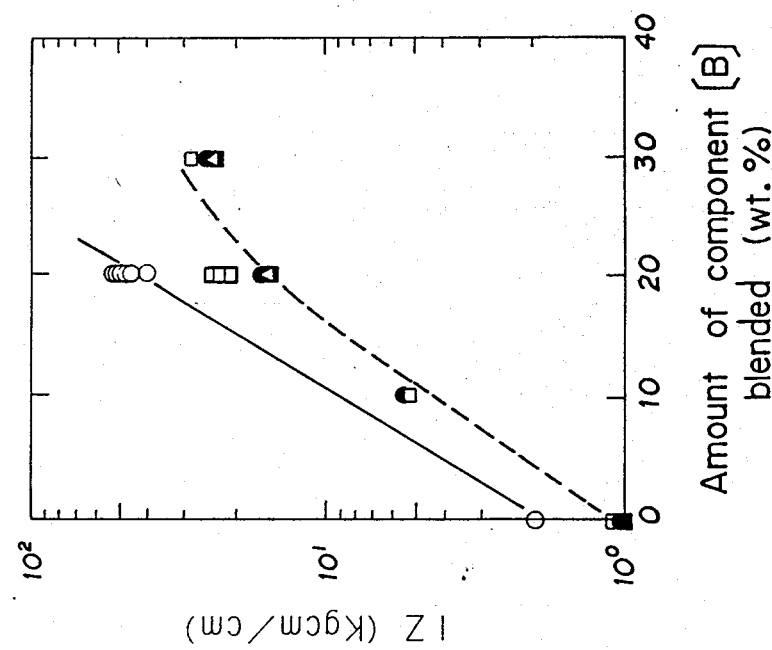
FIG. 9 is a graph showing the relationship between the total amount of two or more non-rigid copolymers (B) blended in the cycloolefin type random copolymer composition of the invention and the impact strength (IZ strength) of said composition.

FIG. 9 is a graph showing the relationship between the amount of the non-rigid copolymers [B] blended in the cycloolefin type random copolymer composition of the present invention and the impact strength (IZ strength) of said composition.

It is apparent from FIG. 9 that the impact resistance of the cycloolefin type random copolymer composition is remarkably improved, when the non-rigid copolymers [B] are blended with the cycloolefin type random copolymer [A].

Figure 10:
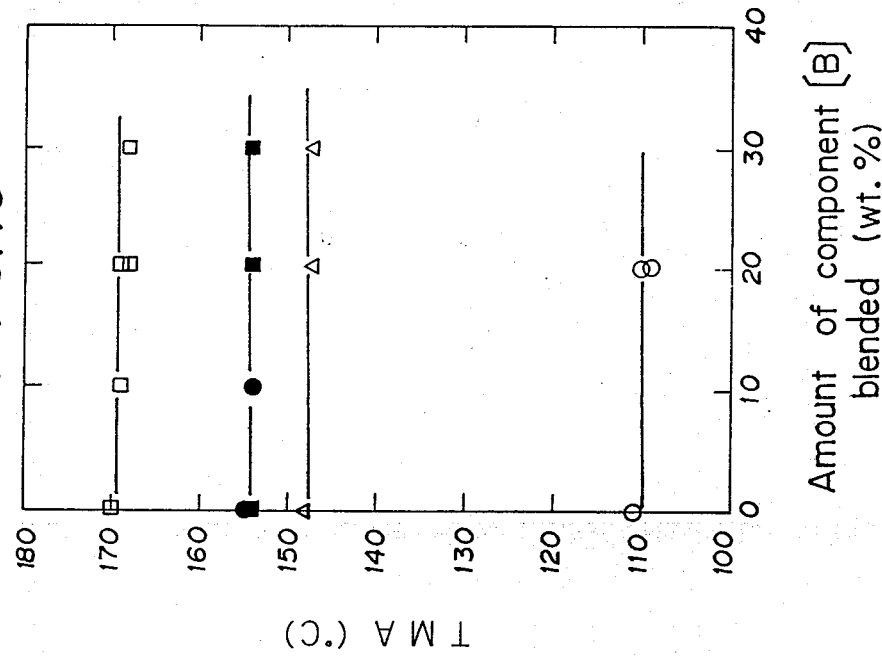
FIG. 10 is a graph showing the relationship between the total amount of the non-rigid copolymer (B) blended in the cycloolefin type random copolymer composition of the invention and the softening temperature of said composition.

FIG. 10 is a graph showing the relationship between the amount of the non-rigid copolymers [B] blended in the cycloolefin type random copolymer composition and the softening temperature (TMA) of said composition.

It is apparent from FIG. 10 that the softening temperature (TMA) of the cycloolefin type random copolymer composition is surprisingly not lowered at all, even when up to about 30 wt. % of the non-rigid copolymer [B] is blended with the cycloolefin type random copolymer [A].

As stated above, the impact resistance of the cycloolefin type random copolymer composition is remarkably improved and heat resistance is not lowered, when up to about 30 wt. % of the non-rigid copolymer [B] is blended with the cycloolefin type random copolymer [A].

In FIGS. 9 and 10, the mark o represents values for Examples 67 to 72 and Comparative Example 23, the mark □ represents values for Examples 73 to 77 and Comparative Example 24, the mark ● represents values for Examples 78 to 80 and Comparative Example 25, the mark ■ represents values for Examples 81 and 82 and Comparative Example 26, and the mark Δ represents values for Examples 83 and 84 and Comparative Example 27.

The second cycloolefin type copolymer compositions of the present invention contain an inorganic or organic filler component (C) in addition to said cycloolefin type random copolymer (A) and said non-rigid copolymer (B).

Concrete examples of the inorganic fillers include silica, silica-alumina, alumina, glass powder, glass bead, glass fiber, glass fiber cloth, glass fiber mat, asbestos, graphite, carbon fiber, carbon fiber cloth, carbon fiber mat, titanium oxide, molybdenum disulfide, magnesium hydroxide, talc, sellaite, metallic powder, metallic fiber, etc.

Concrete examples of the organic fillers include fibrous materials of wholly aromatic polyamides such as polyterephthaloyl-p-phenylenediamine, polyterephthaloylisophthaloyl-p-phenylenediamine, polyisophthaloyl-p-phenylenediamine, polyisophthaloyl-m-phenylenediamine, etc. or fibrous materials of polyamides such as nylon 66, nylon 6, nylon 10, etc.

The fibrous materials may be in any form of single fiber, strand, cloth, mat, etc.

These inorganic or organic fillers may be used either alone or in combination of two or more of them.

The inorganic or organic fillers are incorporated into the cycloolefin type random copolymer compositions for various purposes. For example, they are used for purposes of improving the heat resistance or flame retardance of the compositions, coloring said compositions, improving their rigidity, or inhibiting mold shrinkage factor. They are used in an appropriate amount which meets requirements according to the intended uses of the compositions.

In the second cycloolefin type random copolymer compositions of the present invention, the total amount of the non-rigid copolymer (B) is in the range of 1 to 100 parts by weight, preferably 5 to 100 parts by weight, more preferably 5 to 50 parts by weight based on 100 parts by weight of the cycloolefin type random copolymer (A) and the amount of the inorganic or organic filler (C) is in the range of 1 to 100 parts by weight, preferably 5 to 100 parts by weight, more preferably 5 to 50 parts by weight based on 100 parts by weight of the cycloolefin type random copolymer (A). Impact resistance is lowered, when the total amount of the non-rigid copolymer (B) is less than one part by weight based on 100 parts by weight of the cycloolefin type random copolymer (A), while rigidity is lowered, when the total amount of the non-rigid copolymer (B) is more than 100 parts by weight.

The moldability of the compositions is deteriorated, when the amount of the inorganic or organic filler (C) is more than 100 parts by weight based on 100 parts by weight of the cycloolefin type copolymer (A).

The cycloolefin type random copolymers (A) and (B) (i) which constitute the cycloolefin type random copolymer compositions of the present invention may both be prepared by suitably selecting the conditions under which they are prepared in accordance with the processes as proposed by the present applicant in Japanese Patent L-O-P Publns. Nos. 168708/1985, 120816/1986, 115912/1986, 115916/1986, 95905/1986, 95906/1986, 271308/1986 and 272216/1986.

In preparing the cyloolefin type random copolymer compositions of the present invention, there are applicable various known processes which include, for example, a process wherein the cycloolefin type random copolymers (A) and the non-rigid copolymers (B) are prepared separately, and the copolymers (A) and (B) thus prepared are blended by means of an extruder to obtain a desired composition, a solution blending process wherein the copolymers (A) and (B) are thoroughly dissolved separately in suitable solvents, for example, saturated hydrocarbons such as heptane, hexane, decane, cyclohexane, etc., or aromatic hydrocarbons such as toluene, benzene, xylene, etc., and the respective solutions are subjected to solution blending to obtain a desired composition, or a process wherein the copolymers (A) and (B) are prepared individually by means of separate polymerization reactors, and the resulting polymers are blended with a third vessel to obtain a desired composition.

An intrinsic viscosity [η] as measured at 135° C. in decalin of the cycloolefin type random copolymer compositions of the present invention is in the range of 0.05–10 dl/g, preferably 0.2–3 dl/g, and a softening temperature (TMA) as measured with a thermal mechanical analyzer of said compositions is in the range of 80°–250° C., preferably 100°–200° C., and a glass transition temperature (Tg) of said compositions is in the range of 70°–230° C., preferably 90°–210° C.

The cycloolefin type random copolymer compositions contain the aforesaid cycloolefin type copolymer (A) and the aforesaid non-rigid copolymer (B), and optionally said inorganic or organic filler. In addition to the above-mentioned components, however, the present compositions may be incorporated with heat stabilizers, weathering stabilizers, antistatic agents, slip agents, anti-blocking agents, anti-fogging agents, lubricants, dyes, pigments, natural oil, synthetic oil, wax, etc., and amounts of these additives may be suitably decided. For instance, the stabilizers which may be optionally incorporated include concretely phenolic antioxidants such as tetrakis [methylene-3-(3,5-di-t-butyl-4-hydroxyphenyl)propionate] methane, $\beta$-(3,5-di-t-butyl-4-hydroxyphenyl)propionic acid alkyl ester, 2,2'-oxamidobis[ethyl-3-(3,5-di-t-butyl-4-hydroxyphenyl)] propionate, etc., metallic salts of fatty acid such as zinc stearate, calcium stearate, calcium 12-hydroxystearate, etc., and fatty esters of polyhydric alcohol such as glycerin monostearate, glycerin monolaurate, glycerin distearate, pentaerythritol distearate, pentaerythritol tristearate, etc. These compounds may be incorporated into the present compositions either singly or in combination. For instance, there may be used such a combination of tetrakis [methylene-3-(3,5-di-t-butyl-4-hydroxyphenyl)propionate] methane with zinc stearate or glycerin monostearate, and the like combinations.

EFFECT OF THE INVENTION

The cycloolefin type random copolymer compositions of the present invention comprise the cycloolefin type random copolymer (A), the cycloolefin type random copolymer (B) and optionally, the inorganic or organic filler (C), in which said copolymer (B) and said inorganic or organic filler (C) are present in specific on the basis of 100 parts by weight of said copolymer (A), are excellent in heat resistance, heat ageing characteristics, chemical resistance, solvent resistance, dielectric characteristics and rigidity as well as in impact resistance.

—EMBODIMENT OF THE INVENTION

The present invention is illustrated below in more detail with reference to examples. Various physical properties indicated in the examples were measured or evaluated according to the following procedures.

(1) Softening temperature (TMA): Using Thermomechanical Analyser TMA 10 (manufactured by Seiko Denshi K.K.), the softening temperature was measured in terms of heat deformation behavior of a test sheet of a 1 mm thick. That is, to a quartz needle placed vertically on the test sheet was applied a load of 50 g, while elevating the temperature at a rate of 5° C./min of the test sheet, and an elevated temperature at which the needle penetrated 0.1 mm into the test sheet was taken as the softening temperature (TMA).

(2) Impact strength: Using Izod impact tester (manufactured by Toyo Seiki KK), a test piece (length: 63.8 mm, width: 12.7 mm) punched out of a 2 mm thick pressed sheet and notched (0.25 mm Ⓡ) was tasted at 23° C.

(3) Modulus of rigidity (flexural modulus): Using Instron tensile tester, a test piece (length: 63.8 mm, width: 12.7 mm) punched out of a 2 mm thick pressed sheet was tasted under conditions including a compression rate of 5 mm/min, a distance between supports of 32 mm and a temperature of 23° C.

The IZ impact test and the flexural test were conducted after 3 days from pressing.

POLYMERIZATION EXAMPLE 1a

Preparation of copolymer (A) having a softening temperature of at least 70° C.

With a 2-liter glass polymerization reactor equipped with a stirring blade, there was carried out continuously a copolymerization reaction between ethylene and 1,4,5,8-dimethano-1,2,3,4,4a,5,8,8a-octahydronaphthalene (structural formula:

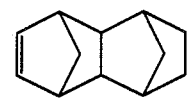

hereinafter abbreviated to DMON). That is, into the polymerization reactor were continuously charged a solution of DMON in cyclohexane so that the DMON concentration in the polymerization reactor became 60 g/l, a solution of $VO(OC_2H_5)Cl_2$ as a catalyst in cyclohexane so that the vanadium concentration in the polymerization reactor became 0.9 mmol/l, and a solution of ethylaluminum sesquichloride $(Al(C_2H_5)_{1.5}Cl_{1.5})$ in cyclohexane so that the aluminum concentration in the polymerization reactor became 7.2 mmol/l, while continuously withdrawing from the bottom of the polymerization reactor the polymerization liquid so that the volume of the polymerization liquid in the polymerization reactor was constantly 1 litre. Simultaneously, into the polymerization reactor from the top of the polymerization reactor ethylene was fed at a rate of 85 l/hr, hydrogen was fed at a rate of 6 l/hr and nitrogen was fed at a rate of 45 l/hr. The copolymerization reaction was carried out at 10° C. by circulating a refrigerant through a jacket fitted externally to the polymerization reactor.

The copolymerization was carried out under the conditions as illustrated above, whereupon a polymerization reaction mixture containing an ethylene DMON random copolymer was obtained. The polymerization reaction was stopped by adding a small amount of isopropyl alcohol to the polymerization liquid withdrawn from the bottom of the reactor. Thereafter, the polymerization liquid was poured into a household mixer containing acetone of about three times the volume of the polymerization liquid, while rotating the mixer, thereby depositing the resulting copolymer. The deposited copolymer was collected by filtration, dispersed in acetone so that the polymer concentration became about 50 g/l, and the copolymer was treated at the boiling point of acetone for 2 hours. After the treatment as above, the copolymer was collected by filtration and dried at 120° C. overnight (12 hours) under reduced pressure.

The thus obtained ethylene DMON-random copolymer (A) had an ethylene unit of 59 mol % as measured by $^{13}$C-NMR analysis, an intrinsic viscosity [$\eta$] of 0.42 dl/g as measured at 135° C. in decalin, and a softening temperature (TMA) of 154° C.

POLYMERIZATION EXAMPLE 1b

Preparation of copolymer (A) having a softening temperature of at least 70° C.

In Example 1b, a copolymerization reaction was continuously carried out in the same manner as in Example 1a. After the completion of the copolymerization reaction, the resulting copolymer was precipitated out, recovered and dried at 120° C. overnight under reduced pressure.

The thus obtained ethylene DMON copolymer (A) had an ethylene unit of 59 mol % as measured by 13C-NMR analysis, an intrinsic viscosity [η] of 0.60 dl/g as measured at 135° C. in decalin and a softening temperature (TMA) of 111° C.

POLYMERIZATION EXAMPLE 2

Preparation of copolymer (A) having an intrinsic viscosity [η] different from that of the copolymer (A) of Polymerization Example 1a The same copolymerization reaction as in Polymerization Example 1a was continuously carried out except that the concentrations of DMON, VO(OC$_2$H$_5$)Cl$_2$ and ethylaluminum sesquichloride in the polymerization reactor and the feed rates of ethylene, hydrogen and nitrogen were those given in Table 5. After the completion of the copolymerization, the resulting copolymer was deposited, recovered and dried at 120° C. under reduced pressure for 12 hours as in polymerization Example 1a. The thus obtained ethylene DMON copolymer (A) had an ethylene unit of 58 mol % as measured by $^{13}$C-NMR analysis, an intrinsic viscosity [η] of 0.94 dl/g as measured at 135° C. in decalin and softening temperature of 170° C.

POLYMERIZATION EXAMPLE 3

Preparation of copolymer (A) having an intrinsic viscosity [η] different from that of the copolymer (A) of Polymerization Example 1a The same copolymerization reaction as in Polymerization Example 1a was continuously carried out except that the concentrations of DMON, VO(OC$_2$H$_5$)Cl$_2$ and ethylaluminum sesquichloride in the polymerization reactor and the feed rates of ethylene, hydrogen and nitrogen were those given in Table 5. After the completion of the copolymerization, the resulting copolymer was deposited, recovered and dried at 120° C. overnight (12 hours) under reduced pressure as in polymerization Example 1a. The thus obtained ethylene DMON copolymer (A) had an ethylene unit of 67 mol % as measured by $^{13}$C-NMR analysis, an intrinsic viscosity [η] of 0.60 dl/g as measured at 135° C. in decalin and a softening temperature (TMA) of 111° C.

TABLE 5

| | | Polymn. Ex. 2 | Polymn. Ex. 3 |
|---|---|---|---|
| VO(DC$_2$H$_5$)Cl$_2$ | (mmol/l) | 0.9 | 0.9 |
| Ethylaluminum sesquichloride | (mmol/l) | 7.2 | 7.2 |
| DMON | (g/l) | 60 | 30 |
| Ethylene | (l/hr) | 100 | 85 |
| Hydrogen | (l/hr) | 0.2 | 0.2 |
| Nitrogen | (l/hr) | 45 | 45 |

POLYMERIZATION EXAMPLE 4

Preparation of copolymer (B) having a softening temperature of below 70° C.

The same copolymerization reaction as in Polymerization Example 1a was carried out except that DMON, VO(OC$_2$H$_5$)Cl$_2$ and ethylaluminum sesquichloride were fed into the polymerization reactor so that the concentrations of DMON, VO(OC$_2$H$_5$)Cl$_2$ and ethylaluminum sesquichloride in the polymerization reactor became 15 g/l, 0.5 mmol/l and 4 mmol/l, respectively, and that ethylene, propylene, hydrogen and nitrogen were fed into the polymerization reactor at rates of 45 l/hr, 15 l/hr, 0.2 l/hr, and 25 l/hr, respectively, and the polymerization temperature was 10° C. After the completion of the copolymerization, the resulting copolymer was deposited, collected and dried at 120° C. under reduced pressure for 12 hours as in polymerization Example 1a.

The thus-obtained ethylene propylene DMON copolymer (B) had an ethylene unit of 76 mol % and a propylene unit of 17 mol % as measured by $^{13}$C-NMR analysis, an intrinsic viscosity [η] of 0.89 dl/g as measured at 135° C. in decalin and a softening temperature (TMA) of −10° C.

POLYMERIZATION EXAMPLE 5

Preparation of copolymer (B) having an intrinsic viscosity [η] different from that of the copolymer (B) of Polymerization Example 4

The same copolymerization reaction as in Example 4 was carried out except that the concentrations of DMON, VO(OC$_2$H$_5$)Cl$_2$ and ethylaluminum sesquichloride in the polymerization reactor and the feed rates of ethylene, propylene, hydrogen and nitrogen were those given in Table 6. After the completion of the copolymerization, the resulting copolymer was deposited, collected and dried at 120° C. under reduced pressure for 12 hours as in Polymerization Example 1a.

The thus obtained ethylene propylene DMON copolymer (B) had an ethylene unit of 69 mol % and a propylene unit of 21 mol % as measured by $^{13}$C-NMR analysis, an intrinsic viscosity [η] of 1.44 dl/g as measured at 135° C., in decalin and a softening temperature (TMA) of −4° C.

POLYMERIZATION EXAMPLE 6

Preparation of copolymer (B) having an intrinsic viscosity [η] different from that of the copolymer (B) of Polymerization Example 4

The same copolymerization reaction as in Polymerization Example 4 was carried out except that the concentrations of DMON, VO(OC$_2$H$_5$)Cl$_2$ and ethylaluminum sesquichloride in the polymerization reactor and the feed rates of ethylene, propylene, hydrogen and nitrogen were those given in Table 6. After the completion of the copolymerization, the resulting copolymer was deposited, collected and dried at 120° C. under reduced pressure for 12 hours as in Polymerization Example 1a.

The thus obtained ethylene propylene DMON copolymer (B) had an ethylene unit of 76 mol % and a propylene unit of 16 mol % as measured by $^{13}$C-NMR analysis, an intrinsic viscosity [η] of 0.98 dl/g as measured at 135° C. in decalin and a softening temperature (TMA) of −8° C.

TABLE 6

| | | Polymn. Ex. 5 | Polymn. Ex. 6 |
|---|---|---|---|
| VO(DC$_2$H$_5$)Cl$_2$ | (mmol/l) | 0.5 | 0.5 |
| Ethylaluminum sesquichloride | (mmol/l) | 4 | 4 |
| DMON | (g/l) | 20 | 15 |
| Ethylene | (l/hr) | 45 | 45 |
| Propylene | (l/hr) | 30 | 15 |
| Hydrogen | (l/hr) | 0.1 | 0.1 |
| Nitrogen | (l/hr) | 25 | 25 |

EXAMPLE 1

In 2 liters of cyclohexane were poured 85 g of the copolymer (A) obtained in Polymerization Example 3 and 15 g of the copolymer (B) obtained in Polymerization Example 5 (weight ratio: (A)/(B)=85/15), and dissolved at about 70° C. while thoroughly stirring to obtain a homogeneous solution. The thus obtained homogeneous solution was poured in 2 liters of acetone to deposit an (A)/(B) blend. The thus obtained blend was dried at 120° C. under reduced pressure overnight.

The (A)/(B) blend thus obtained was incorporated with 0.5%, based on the total weight of the resins [A] and [B], of tetrakis [methylene-3-(3,5di-t-butyl-4-hydroxyphenyl)propionate] methane as stabilizer. The resulting blend was kneaded at 190° C. by using Brabender Plastograph and compression molded at 240° C. to obtain a pressed sheet of 2 mm in thickness. Test pieces were punched out of the sheet, and impact test, flexural test and TMA measurement were carried out. It was found that the blend had an Izod impact strength of 40.0 kg.cm/cm, flexural modulus of 22100 kg/cm$^2$, stress at flexural yield point of 830 kg/cm$^2$ and a TMA of 108° C. There could be obtained a blend excellent in rigidity and heat resistance as well as in impact strength.

COMPARATIVE EXAMPLE 1

The copolymer (A) prepared in Polymerization Example 3 was compression-molded at 240° C. to obtain a pressed sheet of 2 mm in thickness. Test pieces punched out of the sheet were subjected to impact test, flexural test and TMA measurement in the same manner as in Example 1. The sample was found to have an Izod impact strength of 2.0 kg.cm/cm, a flexural modulus of 28900 kg/cm$^2$, stress at flexural yield point of 870 kg/cm$^2$ and a TMA of 110° C. Therefore, the sample was low in impact resistance and brittle, though it was excellent in rigidity and heat resistance.

EXAMPLES 2 to 4

The copolymers (A) prepared in Polymerization Examples 1a and 3 were blended with the copolymers (B) prepared in Polymerization Examples 4 and 5 as in Example 1 in weight ratios indicated in Table 7 and evaluated in the same manner as in Example 1. The results are shown in Table 7.

COMPARATIVE EXAMPLES 2 and 3

The copolymers (A) prepared in Polymerization Examples 1a and 2 were evaluated in the same manner as in Comparative Example 1. The results are shown in Table 7. The samples were low in impact resistance and brittle, though the samples were excellent in rigidity and heat resistance.

EXAMPLE 5

A blend composed of 80 g of the copolymer (A) prepared in Polymerization Example 2 and 20 g of the copolymer (B) prepared in Polymerization Example 6 (weight ratio: (A)/(B)=80/20) was incorporated with 0.5%, based on the total weight of the resins (A) and (B), of tetrakis[methylene-3-(3,5-di-t-butyl-4-hydroxyphenyl)propionate] methane as stabilizer. The blend was kneaded at 190° C. by using Brabender Plastograph and evaluated in the same manner as in Example 1. The results are shown in Table 7. There could be obtained a composition excellent in rigidity and heat resistance as well as in impact resistance.

EXAMPLES 6 and 7

The copolymer (A) prepared in Polymerization Example 2 was blended with the copolymer (B) prepared in Polymerization Example 6 in the manner as in Example 5 in weight ratios indicated in Table 7, and evaluated in the manner as in Example 5. The results are shown in Table 7.

EXAMPLES 8 to 15

Copolymers (A) indicated in Table 8 which had been prepared substantially following the procedure of Polymerization Example 1a were blended with copolymers (B) indicated in Table 8 which had been prepared substantially following the procedure of Polymerization Example 4 in the following the procedure of Polymerization Example 4 in the manner as in Example 5 in weight ratios indicated in Table 8, and evaluated in the manner as in Example 5.

COMPARATIVE EXAMPLES 4 to 6

Copolymers (A) indicated in Table 9 which had been prepared substantially following the procedure of Polymerization Example 1a were tested as in Comparative Example 1. The results are shown in Table 9. The samples were low in impact resistance and brittle, though they were excellent in rigidity and heat resistance.

TABLE 7

| | Copolymer (A) | | | | | |
| | | | Composition (mol %) | | [η] | TMA |
| | Cycloolefin | Third monomer | Ethylene | Third monomer | (dl/g) | (°C.) |
| --- | --- | --- | --- | --- | --- | --- |
| Ex. 1 |  | — | 67 | — | 0.60 | 111 |
| 2 | " | — | " | — | " | " |
| 3 | " | — | " | — | " | " |
| 4 | " | — | 59 | — | 0.42 | 154 |
| 5 | " | — | 58 | — | 0.94 | 170 |
| 6 | " | — | " | — | " | " |
| 7 | " | — | " | — | " | " |
| Comp. Ex. 1 | " | — | 67 | — | 0.60 | 111 |
| 2 | " | — | 59 | — | 0.42 | 154 |
| 3 | " | — | 58 | — | 0.94 | 170 |

TABLE 7-continued

| | | Copolymer (B) | | | | |
| | | | Composition (mol %) | | [η] | TMA |
| | Cycloolefin | Third monomer | Ethylene | Third monomer | (dl/g) | (°C.) |
|---|---|---|---|---|---|---|
| Ex. 1 |  | Propylene | 69 | 21 | 1.44 | −4 |
| 2 | " | " | " | " | " | " |
| 3 | " | " | 76 | 17 | 0.89 | −10 |
| 4 | " | " | 69 | 21 | 1.44 | −4 |
| 5 | " | " | 76 | 16 | 0.98 | −8 |
| 6 | " | " | " | " | " | " |
| 7 | " | " | " | " | " | " |
| Comp. Ex. 1 | — | — | — | — | — | — |
| 2 | — | — | — | — | — | — |
| 3 | — | — | — | — | — | — |

| | Blending ratio (A)/(B) (weight ratio) | Izod impact strength (kg · cm/cm) | Flexural modulus (kg/cm²) | Stress at fluexural yield point (kg/cm²) | TMA (°C.) |
|---|---|---|---|---|---|
| Ex. 1 | 85/15 | 40.0 | 22100 | 830 | 110 |
| 2 | 80/20 | 70.1 | 18900 | 730 | 109 |
| 3 | 70/30 | 88.2 | 16500 | 640 | 110 |
| 4 | 80/20 | 9.8 | 20100 | 750 | 153 |
| 5 | 80/20 | 11.1 | 24800 | 950 | 169 |
| 6 | 75/25 | 20.7 | 24400 | 900 | 168 |
| 7 | 70/30 | 42.5 | 18700 | 730 | 168 |
| Comp. Ex. 1 | 100/0 | 2.1 | 28900 | 870 | 111 |
| 2 | 100/0 | 1.1 | 31700 | 960 | 154 |
| 3 | 100/0 | 1.1 | 35000 | 1110 | 170 |

TABLE 8

| | | Copolymer (A) | | | | |
| | | | Composition (mol %) | | [η] | TMA |
| | Cycloolefin | Third monomer | Ethylene | Third monomer | (dl/g) | (°C.) |
|---|---|---|---|---|---|---|
| EX. 8 | 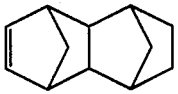 | Butene | 60 | 0.9 | 0.50 | 155 |
| 9 | " | " | " | " | " | " |
| 10 | 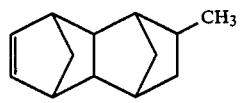 | — | 62 | — | 0.48 | 154 |
| 11 | " | — | " | — | " | " |
| 12 |  | — | 67 | — | 0.60 | 111 |
| 13 | " | — | " | — | " | " |
| 14 | 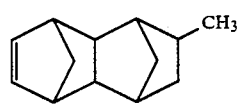 | Butene | 61 | 1.2 | 0.46 | 148 |
| 15 | " | " | " | " | " | " |

| | | Copolymer (B) | | | | |
| | | | Composition (mol %) | | [η] | TMA |
| | Cycloolefin | Third monomer | Ethylene | Third monomer | (dl/g) | (°C.) |

TABLE 8-continued

| EX. | | | | | | | |
|---|---|---|---|---|---|---|---|
| 8 | 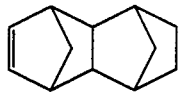 | Propylene | 69 | 21 | 1.44 | −4 | |
| 9 | | " | " | " | " | " | |
| 10 | | " | " | " | " | " | |
| 11 | | " | " | " | " | " | |
| 12 | 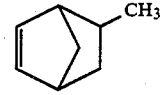 | Butene | 72 | 18 | 0.86 | −6 | |
| 13 | | " | " | " | " | " | |
| 14 | 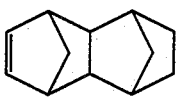 | Butene | 74 | 18 | 0.82 | −8 | |
| 15 | | " | " | " | " | " | |

| | Blending ratio (A)/(B) (weight ratio) | Izod impact strength (kg·cm/cm) | Flexural modulus (kg/cm$^2$) | Stress at fluexural yield point (kg/cm$^2$) | TMA (°C.) |
|---|---|---|---|---|---|
| Ex. 8 | 80/20 | 16.2 | 18200 | 560 | 155 |
| 9 | 70/30 | 32.1 | 16700 | 610 | 154 |
| 10 | 80/20 | 15.4 | 18600 | 560 | 154 |
| 11 | 70/30 | 22.4 | 16600 | 550 | 152 |
| 12 | 90/10 | 8.2 | 22500 | 840 | 110 |
| 13 | 80/20 | 50.1 | 18500 | 560 | 110 |
| 14 | 90/10 | 5.1 | 22800 | 850 | 147 |
| 15 | 80/20 | 24.2 | 18200 | 540 | 147 |

TABLE 9

| | Copolymer (A) | | | | | |
|---|---|---|---|---|---|---|
| | | | Composition (mol %) | | [η] | TMA |
| | Cycloolefin | Third monomer | Ethylene | Third monomer | (dl/g) | (°C.) |
| Comp. EX. 4 |  | Butene | 60 | 0.9 | 0.50 | 155 |
| 5 | 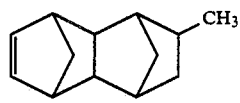 | — | 62 | — | 0.48 | 154 |
| 6 | 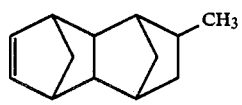 | Butene | 61 | 1.2 | 0.46 | 148 |

| | Copolymer (B) | | | | | |
|---|---|---|---|---|---|---|
| | | | Composition (mol %) | | [η] | TMA |
| | Cycloolefin | Third monomer | Ethylene | Third monomer | (dl/g) | (°C.) |
| Comp. EX. 4 | — | — | — | — | — | — |
| 5 | — | — | — | — | — | — |
| 6 | — | — | — | — | — | — |

| | Blending ratio (A)/(B) (weight ratio) | Izod impact strength (kg·cm/cm) | Flexural modulus (kg/cm$^2$) | Stress at flexural yield point (kg/cm$^2$) | TMA (°C.) |
|---|---|---|---|---|---|
| Comp. Ex. 4 | 100/0 | 1.0 | 31800 | 960 | 155 |
| 5 | 100/0 | 0.9 | 30500 | 930 | 154 |
| 6 | 100/0 | 1.1 | 30900 | 930 | 148 |

EXAMPLE 16

90 g of the copolymer (A) prepared in Polymerization Example 3 and 10 g of an ethylene-propylene random copolymer (B) (ethylene/propylene=80/20 mol %) (weight ratio: (A)/(B)=90/10 ) were poured in two liters of cyclohexane and dissolved at about 70° C. while thoroughly stirring. The resulting homogeneous solution was poured in two liters of acetone to deposit an (A)/(B) blend. The thus obtained blend was dried at 120° C. under reduced pressure overnight.

The (A)/(B) blend was incorporated with 0.5%, based on the total weight of the resins (A) and (B), of tetrakis [methylene-3-(3,5-di-t-butyl-4-hydroxyphenyl) propionate] methane as stabilizer. The blend was kneaded at 190° C. by using Brabender Plastograph and compression-molded at 240° C. to obtain a pressed sheet of 2 mm in thickness. Test pieces were punched out of the sheet and subjected to impact test, flexural test and TMA measurement. The blend was found to have an Izod impact strength of 9.4 kg.cm/cm, a flexural modulas of 23000 kg/cm$^2$, a stress at flexural yield point of 840 kg/cm$^2$ and a TMA of 110° C. There was obtained a blend excellent in rigidity and heat resistance as well as in impact strength.

COMPARATIVE EXAMPLE 7

The copolymer (A) prepared in Polymerization Example 3 was compression-molded at 240° C. to obtain a pressed sheet of 2 mm in thickness. Test pieces punched out of the sheet were tested in the same manner as in Example 16. The test pieces were found to have an Izod impact strength of 2.0 kg.cm/cm, a flexural modulus of 28900 kg/cm$^2$, stress at flexural yield point of 870 kg/cm$^2$ and a TMA of 110° C. Hence, the sample was low in impact strength and brittle, though it was excellent in rigidity and heat resistance.

EXAMPLES 17 AND 18

The copolymer (A) prepared in Polymerization Example 3 and the ethylene propylene copolymer (B) were processed and evaluated as in Example 16 except that the copolymers were blended in weight ratios indicated in Table 10. The results are shown in Table 10. There could be obtained compositions excellent in rigidity and heat resistance as well as in impact resistance.

EXAMPLE 19

The polymer (A) prepared in Polymerization Example 3 and an ethylene-1-butene copolymer (B) indicated in Table 10 were blended together in a weight ratio given in Table 10, processed and evaluated in the same manner as in Example 16. The results are shown in Table 10. There could be obtained a composition excellent in rigidity and heat resistance as well as high in impact resistance.

EXAMPLE 20

A blend of 80 g of the copolymer (B) prepared in Polymerization Example 3 and 20 g of an ethylene-1-butene copolymer (B) indicated in Table 10 (weight ratio: (A)/(B)=80/20) was incorporated with 0.5%, based on the total weight of the resins (A) and (B), of tetrakis [methylene-3-(3,5-di-t-butyl-4-hydroxyphenyl) propionate] methane as stabilizer. The blend was kneaded at 190° C. by using Brabender Plastograph and evaluated in the same manner as in Example 16. The results are shown in Table 10. There could be obtained a composition excellent in rigidity and heat resistance as well as in impact resistance.

COMPARATIVE EXAMPLE 8

The copolymer (A) prepared in Polymerization Example 2 was compression-molded at 240° C. to obtain a pressed sheet of 2 mm in thickness. The evaluation thereof was made in the same manner as in Example 16. The results are shown in Table 10. The test sample was found to be low in impact resistance and to be brittle, though it was excellent in rigidity and heat resistance.

EXAMPLES 21 AND 23

Blends of the copolymer (A) prepared in polymerization Example 2 and an ethylene propylene copolymer (B) indicated in Table 10 in weight ratios given in Table 10 were processed and evaluated in the same manner as in Example 16. The results are shown in Table 10. There could be obtained compositions excellent in rigidity and heat resistance as well as high in impact resistance.

EXAMPLES 24 TO 29

Copolymers (A) indicated in Table 11 which had been prepared substantially following the procedure of Polymerization Example 2 and α-olefin type random copolymers indicated in Table 11 were blended in the manner as in Example 20 in weight rations indicated in Table 11, and evaluated in the manner as in Example 20.

COMPARATIVE EXAMPLES 9 TO 11

Copolymers indicated in Table 12 which had been prepared substantially following the procedure of Polymerization Example 2 were tested as in Comparative Example 7. The results are shown in Table 12. Samples were found to be low in impact strength and to be brittle, though they were excellent in rigidity and heat resistance.

TABLE 10

| | Copolymer (A) | | | | | |
|---|---|---|---|---|---|---|
| | | | Composition (mol %) | | [η] | TMA |
| | Cycloolefin | Third monomer | Ethylene | Third monomer | (dl/g) | (°C.) |
| Ex. 16 | | — | 67 | — | 0.60 | 111 |
| 17 | " | — | " | — | " | " |
| 18 | " | — | " | — | " | " |
| 19 | " | — | " | — | " | " |
| 20 | " | — | " | — | " | " |
| 21 | " | — | 58 | — | 0.94 | 170 |
| 22 | " | — | " | — | " | " |
| 23 | " | — | " | — | " | " |

TABLE 10-continued

| | | | | | | |
|---|---|---|---|---|---|---|
| Comp. Ex. 7 | " | — | 67 | — | 0.60 | 111 |
| 8 | " | — | 58 | — | 0.94 | 170 |

| | Copolymer (B) | | | | | |
|---|---|---|---|---|---|---|
| | Composition (mol %) | | | $[\eta]$ | Crystallinity | Density |
| | Ethylene | Propylene | Butene | (dl/g) | (%) | (g/cm$^3$) |
| Ex. 16 | 80 | 20 | — | 2.2 | 15 | 0.88 |
| 17 | " | " | — | " | " | " |
| 18 | " | " | — | " | " | " |
| 19 | " | " | — | 2.6 | 15 | 0.88 |
| 20 | 90 | — | 10 | 1.4 | 20 | 0.89 |
| 21 | 80 | 20 | — | 2.2 | 15 | 0.88 |
| 22 | " | " | — | " | " | " |
| 23 | " | " | — | " | " | " |
| Comp. Ex. 7 | — | — | — | — | — | — |
| 8 | — | — | — | — | — | — |

| | Blending ratio (A)/(B) (weight ratio) | Izod impact strength (kg·cm/cm) | Flexural modulus (kg/cm$^2$) | Stress at flexural yield point (kg/cm$^2$) | TMA (°C.) |
|---|---|---|---|---|---|
| Ex. 16 | 90/10 | 9.4 | 23000 | 840 | 110 |
| 17 | 80/20 | 37.4 | 18900 | 680 | 109 |
| 18 | 70/30 | 52.0 | 15800 | 580 | 110 |
| 19 | 80/20 | 64.8 | 16800 | 600 | 110 |
| 20 | 80/20 | 7.3 | 18700 | 680 | 110 |
| 21 | 85/15 | 11.7 | 23500 | 850 | 169 |
| 22 | 80/20 | 20.8 | 21000 | 690 | 169 |
| 23 | 75/25 | 21.9 | 17000 | 620 | 169 |
| Comp. Ex. 7 | 100/0 | 2.0 | 28900 | 870 | 111 |
| 8 | 100/0 | 1.1 | 35000 | 1110 | 170 |

TABLE 11

| | Copolymer (A) | | | | | |
|---|---|---|---|---|---|---|
| | Cycloolefin | Third monomer | Composition (mol %) | | $[\eta]$ | TMA |
| | | | Ethylene | Third monomer | (dl/g) | (°C.) |
| EX. 24 | (dicyclic structure) | Butene | 60 | 0.9 | 0.50 | 155 |
| 25 | " | " | " | " | " | " |
| 26 | (dicyclic structure with CH$_3$) | — | 62 | — | 0.48 | 154 |
| 27 | " | — | " | — | " | " |
| 28 | (dicyclic structure with CH$_3$) | Butene | 61 | 1.2 | 0.60 | 148 |
| 29 | " | — | " | " | " | " |

| | Copolymer (B) | | | | | |
|---|---|---|---|---|---|---|
| | Composition (mol %) | | | $[\eta]$ | Crystallinity | Density |
| | Ethylene | Propylene | Butene | (dl/g) | (%) | (g/cm$^3$) |
| Ex. 24 | 80 | 20 | — | 2.2 | 15 | 0.88 |
| 25 | " | " | — | " | " | " |
| 26 | — | 70 | 30 | 2.1 | 22 | 0.08 |
| 27 | — | " | " | " | " | " |
| 28 | 90 | — | 10 | 1.4 | 20 | 0.98 |
| 29 | " | — | " | " | " | " |

| | Blending ratio (A)/(B) (weight ratio) | Izod impact strength (kg·cm/cm) | Flexural modulus (kg/cm$^2$) | Stress at flexural yield point (kg/cm$^2$) | TMA (°C.) |
|---|---|---|---|---|---|
| Ex. 24 | 85/15 | 9.2 | 22000 | 750 | 154 |
| 25 | 80/20 | 15.5 | 18000 | 550 | 153 |
| 26 | 80/20 | 9.8 | 18200 | 560 | 154 |
| 27 | 70/30 | 13.5 | 14700 | 470 | 154 |

TABLE 11-continued

| 28 | 80/20 | 11.2 | 17800 | 540 | 147 |
| 29 | 70/30 | 20.3 | 17500 | 450 | 147 |

TABLE 12

| | Copolymer (A) | | | | |
|---|---|---|---|---|---|
| | | | Composition (mol %) | [η] | TMA |
| | Cycloolefin | Third monomer | Ethylene  Third monomer | (dl/g) | (°C.) |
| Comp. EX. 9 | (dicyclopentadiene structure) | Butene | 60           0.9 | 0.50 | 155 |
| 10 | (methyl-substituted structure), CH₃ | — | 62            — | 0.48 | 154 |
| 11 | (methyl-substituted structure), CH₃ | Butene | 61           1.2 | 0.46 | 148 |

| | Copolymer (B) | | | | | |
|---|---|---|---|---|---|---|
| | Composition (mol %) | | | | | |
| | Ethylene | Propylene | Butene | [η] (dl/g) | Crystallinity (%) | Density (g/cm³) |
| Comp. Ex. 9 | — | — | — | — | — | — |
| 10 | — | — | — | — | — | — |
| 11 | — | — | — | — | — | — |

| | Blending ratio (A)/(B) (weight ratio) | Izod impact strength (kg · cm/cm) | Flexural modulus (kg/cm²) | Stress at flexural yield point (kg/cm²) | TMA (°C.) |
|---|---|---|---|---|---|
| Comp. Ex. 9 | 100/0 | 1.0 | 31800 | 960 | 155 |
| 10 | 100/0 | 0.9 | 30500 | 930 | 154 |
| 11 | 100/0 | 1.1 | 30900 | 930 | 148 |

EXAMPLE 30

90% by weight of the ethylene polycyclic olefin copolymer obtained in Polymerization Example 1a was mixed with 10% by weight of an ethylene propylene random copolymer (hereinafter abbreviated to EPC-I) having a crystallinity index of 5% as measured by X-rays, an ethylene content of 80 mol %, an MFR of 4.6 g/10 min and a density of 0.865 g/cm³ in Henschel mixer. The mixture was melt-kneaded and extruded by means of a 40 mmφ single screw extruder (preset temperature: 230° C.), and pelletized. The pellets were injection-molded (cylinder temperature: 240° C., mold temperature: 70° C.) to obtain test pieces for use in the evaluation of physical properties.

The thus obtained test pieces were subjected to a flexural test (ASTM D 790) and an Izod impact test (ASTM D 256, not notched). The results are shown in Table 13.

EXAMPLE 31

The procedure of Example 30 was repeated except that 70% by weight of the ethylene polycyclic olefin copolymer and 30% by weight of EPC-I were used. In the same way as in Example 30, test pieces for the evaluation of the physical properties were obtained and the flexural test and the Izod impact test were conducted. The results are shown in Table 13.

EXAMPLE 32

The procedure of Example 30 was repeated except that an ethylene 1-butene random copolymer having a crystallinity index of 25% as measured by X-rays, an ethylene content of 92 mol %, an MFR of 18 g/10 min and a density of 0.895 g/cm³ was used in place of EPC-I. In the same way as in Example 30 test pieces for the evaluation of physical properties were prepared and the flexural test and the Izod impact test were conducted. The results are shown in Table 13.

EXAMPLE 33

The procedure of Example 30 was repeated except that an ethylene propylene random copolymer having a crystallinity index of 1% as measured by X-rays, an ethylene content of 40 mol %, an MFR of 1.0 g/10 min and a density of 0.858 g/cm³ was used in place of EPC-I. In the same way as in Example 30 test pieces for the evaluation of physical properties were prepared and the flexural test and the Izod impact test were conducted. The results are shown in Table 13.

EXAMPLE 34

The procedure of Example 30 was repeated except that a modified ethylene 1-butene random copolymer (crystallinity index as measured by X-rays; 15%, MFR: 5 g/10 min) obtained by graft-copolymerizing 0.5 parts by weight of maleic anhydride onto 100 parts by weight of an ethylene 1-butene random copolymer having a crystallinity index of 17% as measured by X-rays, an ethylene content of 89 mol %, an MFR of 4.0 g/10 min and a density of 0.885 g/cm³ was used in place of EPC-I. In the same way as in Example 30 test pieces for the evaluation of physical properties were prepared and the flexural test and the Izod impact test were conducted. The results are shown in Table 13.

COMPARATIVE EXAMPLE 12.

The procedure of Example 30 was repeated except that only the ethylene polycyclic olefin copolymer was used in place of the composition of Example 30 and injection-molded to prepare test pieces. The flexural test and the Izod impact test were conducted. The results are shown in Table 13.

TABLE 13

| | Composition | | Physical properties | | |
|---|---|---|---|---|---|
| | Ethylene polycyclic olefin co-polymer (wt %) | Ethylene α-olefin random co-polymer (wt. %) | Flexural strength (kg/cm²) | Flexural modulus (kg/cm²) | Izod impact strength (kg · cm/cm²) |
| Ex. 30 | 90 | 10 | 800 | 27 | 12 |
| 31 | 70 | 30 | 600 | 20 | 15 |
| 32 | 90 | 10 | 820 | 28 | 12 |
| 33 | 90 | 10 | 830 | 27 | 27 |
| 34 | 90 | 10 | 900 | 26 | 22 |
| Comp. Ex. 12 | 100 | 0 | 900 | 32 | 10 |

EXAMPLE 35

80 g of the copolymer (A) obtained in polymerization Example 3 and 20 g of an ethylene propylene 2-ethylidene-2-norbornene random copolymer (B) (ethylene/propylene/diene=66/31/3 mol %) (weight ratio: (A)/(B)=80/20) were poured in 2 liters of cyclohexane and dissolved at about 70° C. while thoroughly stirring. The resulting homogeneous solution was poured in 2 liters of acetone to deposit an (A)/(B) blend. The blend was dried at 120° C. under reduced pressure overnight.

The thus obtained (A)/(B) blend was incorporated with 0.5%, based on the total weight of the resins (A) and (B), of tetrakis [methylene-3-(3,5-di-t-butyl-4-hydroxyphenyl) propionate] methane as stabilizer. The blend was then kneaded at 190° C. by using Brabender Plastograph and compression-molded at 240° C. to obtain a pressed sheet of 2 mm in thickness. Test pieces were punched out of the sheet and impact test, flexural test and TMA measurement were conducted. The blend was found to have an Izod impact strength of 53.4 kg.cm/cm, a flexural modulus of 16000 kg/cm², stress at flexural yield point of 590 kg/cm² and a TMA of 110° C. Hence, there could be obtained a blend excellent in rigidity and heat resistance as well as in impact strength.

COMPARATIVE EXAMPLE 13

The copolymer (A) prepared in Polymerization Example 3 was compression-molded at 240° C. to obtain a pressed sheet of 2 mm in thickness. In the same way as in Example 35, test pieces were punched out of the sheet and tests were conducted. The test pieces were found to have an Izod impact strength of 2.0 kg.cm/cm, a flexural modulus of 28900 kg/cm², stress at flexural yield point of 870 kg/cm² and a TMA of 111° C. Hence, the sample was found to be low in impact resistance and to be brittle, though it was excellent in rigidity and heat resistance.

EXAMPLES 36 AND 37

Blends of the copolymer (A) prepared in Polymerization Example 3 and the ethylene propylene 5-ethylidene-2-norbornene random copolymer (B) (ethylene/propylene/diene=66/31/3 mol %) in weight ratios given in Table 14 were processed and evaluated in the same manner as in Example 35. The results are shown in Table 14. There could be obtained compositions excellent in rigidity and heat resistance as well as in impact resistance.

EXAMPLES 38 TO 39

Blends of the copolymer (A) obtained in Polymerization Example 3 and an ethylene propylene 5-ethylidene-2-norbornene random copolymer (B) (ethylene/propylene/diene=67/31/2 mol %) in weight ratios given in Table 14 were processed and evaluated in the same manner as in Example 35. The results are shown in Table 14. There could be obtained compositions excellent in rigidity and heat resistance as well as high in impact resistance.

EXAMPLES 40 AND 41

Blends of the copolymer (A) prepared in Polymerization Example 3 and an ethylene propylene dicyclopentadiene random copolymer (B) (ethylene/propylene/diene=67/32/1 mol %), in weight rations indicated in Table 14 were processed and evaluated in the same manner as in Example 35. The results are shown in Table 14.

EXAMPLE 42

A blend of 80 g of the copolymer (A) prepared in Polymerization Example 2 and 20 g of the ethylene propylene 5-ethylidene-2-norbornene random copolymer (B) (ethylene/propylene/diene=66/31/3 mol %) (weight ratio: (A)/(B)=80/20) was incorporated with 0.5%, based on the total weight of the resins (A) and (B), of tetrakis [methylene-3-(3,5-di-t-butyl-4-hydroxyphenyl)propionate] methane as stabilizer. The blend was kneaded at 190° C. by using Brabender Plastograph and evaluated in the same manner as in Example 35. The results are shown in Table 14. There could be obtained a composition excellent in rigidity and heat resistance as well as in impact resistance.

COMPARATIVE EXAMPLE 14

The copolymer (A) prepared in polymerization Example 2 was compression-molded at 240° C. to obtain a pressed sheet of 2 mm in thickness. In the same way as in Example 35, test pieces were prepared, evaluated and found to be low in impact strength and to be brittle, though they were excellent in rigidity and heat resistance.

EXAMPLES 43 AND 44

The copolymer (A) prepared in Polymerization Example 2 was blended with α-olefin diene copolymers (B) given in Table 14 in the same manner as in Example 42. The evaluation of the blends was made. The results are shown in Table 14.

EXAMPLES 45 TO 50

Blends of copolymers (A) indicated in Table 15 and α-olefin-diene elastomers (B) indicated in Table 15 were processed and evaluated in the same way as in Example 42. The results are shown in Table 15. There could be obtained compositions excellent in rigidity and heat resistance as well as in impact resistance.

COMPARATIVE EXAMPLES 15 TO 17

Copolymers (A) indicated in Table 16 were processed and evaluated in the same way as in Comparative Example 14. The results are shown in Table 16.

TABLE 14

| | Copolymer (A) | | | | | Copolymer (B) | | | | | |
|---|---|---|---|---|---|---|---|---|---|---|---|
| | Cyclo-olefin | Third monomer | Composition (mol %) Ethylene | Composition (mol %) Third monomer | [η] (gl/g) | TMA (°C.) | Diene monomer | Composition (mol %)[1] Ethylene | Composition (mol %)[1] Propylene | [η] (dl/g) | Iodine value | Crystallinity index[2] (%) | Density[3] (g/cm³) |
| Ex. 35 |  | — | 67 | — | 0.60 | 111 |  | 66 | 31 | 2.1 | 22 | 0 | 0.87 |
| 36 | " | — | 67 | — | 0.60 | 111 | " | 66 | 31 | 2.1 | 22 | 0 | 0.87 |
| 37 | " | — | 67 | — | 0.60 | 111 | " | 66 | 31 | 2.1 | 22 | 0 | 0.87 |
| 38 | " | — | 67 | — | 0.60 | 111 | " | 67 | 31 | 2.1 | 13 | 0 | 0.87 |
| 39 | " | — | 67 | — | 0.60 | 111 | " | 67 | 31 | 2.1 | 13 | 0 | 0.87 |
| 40 | " | — | 67 | — | 0.60 | 111 |  | 67 | 32 | 2.1 | 10 | 0 | 0.87 |
| 41 | " | — | 67 | — | 0.60 | 111 | " | 67 | 32 | 2.1 | 10 | 0 | 0.87 |
| 42 | " | — | 58 | — | 0.94 | 170 |  | 66 | 31 | 2.1 | 22 | 0 | 0.87 |
| 43 | " | — | 58 | — | 0.94 | 170 | " | 67 | 31 | 2.1 | 13 | 0 | 0.87 |
| 44 | " | — | 58 | — | 0.94 | 170 |  | 67 | 32 | 2.1 | 10 | 0 | 0.87 |
| Comp. Ex. 13 | " | — | 67 | — | 0.60 | 111 | — | — | — | — | — | — | — |
| 14 | " | — | 58 | — | 0.94 | 170 | — | — | — | — | — | — | — |

| | Blending ratio (A)/(B) (weight ratio) | Izod impact strength (kg·cm/cm) | Flexural modulus (kg/cm²) | Stress at flexural yield point (kg/cm²) | TMA (°C.) |
|---|---|---|---|---|---|
| Ex. 35 | 80/20 | 53.4 | 16000 | 590 | 110 |
| 36 | 85/15 | 20.5 | 20500 | 760 | 109 |
| 37 | 90/10 | 5.3 | 23400 | 870 | 110 |
| 38 | 80/20 | 45.3 | 16500 | 610 | 110 |
| 39 | 70/30 | 62.3 | 14100 | 520 | 109 |
| 40 | 80/20 | 12.5 | 15800 | 590 | 110 |
| 41 | 75/25 | 29.1 | 14400 | 460 | 110 |
| 42 | 80/20 | 7.5 | 23000 | 900 | 169 |
| 43 | 80/20 | 6.8 | 23100 | 900 | 169 |
| 44 | 80/20 | 5.1 | 22800 | 870 | 168 |
| Comp. Ex. 13 | 100/0 | 2.0 | 28900 | 870 | 111 |
| 14 | 100/0 | 1.1 | 35000 | 1110 | 170 |

[1] 13C-NMR method
[2] X-ray diffractometry
[3] Density-gradient method

TABLE 15

| | Copolymer (A) | | | | | | Copolymer (B) | | | | | |
|---|---|---|---|---|---|---|---|---|---|---|---|---|
| | Cyclo-olefin | Third monomer | Composition (mol %) Ethylene | Composition (mol %) Third monomer | [η] (dl/g) | TMA (°C.) | Diene monomer | Composition (mol %) Ethylene | Composition (mol %) Propylene | [η] (dl/g) | Iodine value | Crystallinity index (%) | Density (g/cm³) |
| Ex. 45 |  | Butene | 60 | 0.9 | 0.50 | 155 |  | 66 | 31 | 2.1 | 22 | 0 | 0.87 |
| 46 | " | Butene | 60 | 0.9 | 0.50 | 155 | " | 66 | 31 | 2.1 | 22 | 0 | 0.87 |
| 47 |  | — | 62 | — | 0.48 | 154 | " | 66 | 31 | 2.1 | 22 | 0 | 0.87 |
| 48 | " | — | 62 | — | 0.48 | 154 | " | 66 | 31 | 2.1 | 22 | 0 | 0.87 |

TABLE 15-continued
| | | | | | | | | | | | | | |
|---|---|---|---|---|---|---|---|---|---|---|---|---|---|
| 49 |  CH₃ | Butene | 61 | 1.2 | 0.46 | 148 |  | 67 | 31 | 2.1 | 13 | 0 | 0.87 |
| 50 | " | Butene | 61 | 1.2 | 0.46 | 148 | " | 67 | 31 | 2.1 | 13 | 0 | 0.87 |
| | Blending ratio (A)/(B) (weight ratio) | Izod impact strength (kg · cm/cm) | Flexural modulus (kg/cm²) | Stress at flexural yield point (kg/cm²) | TMA (°C.) |
|---|---|---|---|---|---|
| Comp. Ex. 45 | 85/15 | 8.2 | 22100 | 740 | 153 |
| 46 | 80/20 | 30.0 | 18500 | 590 | 153 |
| 47 | 80/20 | 35.5 | 18300 | 570 | 154 |
| 48 | 70/30 | 42.1 | 15200 | 470 | 153 |
| 49 | 80/20 | 38.9 | 17900 | 530 | 1 |
| 50 | 70/30 | 51.1 | 16200 | 410 | 147 |

TABLE 16

| | Copolymer (A) | | | | | Copolymer (B) | | | | | | |
|---|---|---|---|---|---|---|---|---|---|---|---|---|
| | | Composition (mol %) | | | | | Composition (mol %) | | | | | |
| | Cyclo-olefin | Third monomer | Ethylene | Third monomer | [η] (dl/g) | TMA (°C.) | Diene monomer | Ethylene | Propylene | [η] (dl/g) | Iodine value | Crystallinity index (%) | Density (g/cm³) |
| Comp. Ex. 15 | (tetracyclic structure) | Butene | 60 | 0.9 | 0.50 | 155 | — | — | — | — | — | — | — |
| 16 | (tetracyclic structure with CH₃) | — | 62 | — | 0.48 | 154 | — | — | — | — | — | — | — |
| 17 | (tetracyclic structure with CH₃) | Butene | 61 | 1.2 | 0.46 | 148 | — | — | — | — | — | — | — |

| | Blending ratio (A)/(B) (weight ratio) | Izod impact strength (kg·cm/cm) | Flexural modulus (kg/cm²) | Stress at flexural yield point (kg/cm²) | TMA (°C.) |
|---|---|---|---|---|---|
| Comp. Ex. 15 | 100/0 | 1.0 | 31800 | 960 | 155 |
| 16 | 100/0 | 0.9 | 30500 | 930 | 154 |
| 17 | 100/0 | 1.1 | 30900 | 930 | 148 |

EXAMPLE 51

A dry blend of 90 g of the copolymer (A) obtained in Polymerization Example 3 and 10 g of a styrene-butadiene-styrene block copolymer (B) (density: 0.94 g/cm$^3$, Cariflex TR1102, a product of Shell Kagaku KK) (weight ratio: (A)/(B)=90/10) was incorporated with 0.5% and 0.3%, based on the total weight of the resins (A) and (B), of tetrakis [methylene-3-(3,5-di-t-butyl-4-hydroxyphenyl)propionate] methane and dilauryl thiodipropionate as stabilizers, respectively. The resulting blend was kneaded at 190° C. by using Brabender Plastograph and compression-molded at 240° C. to prepare pressed sheets of 1 mm in thickness and a pressed sheet of 2 mm in thickness, respectively. Test pieces were punched out of these sheets and impact test, flexural test and TMA measurement were conducted.

The blend was found to have an Izod impact strength of 5.0 kg.cm/cm, a flexural modulus of 23000 kg/cm$^2$ and a TMA of 111° C. Hence, there could be obtained a blend excellent in rigidity and heat resistance as well as in impact strength.

COMPARATIVE EXAMPLE 18

The copolymer (A) prepared in Polymerization Example 3 was compression-molded at 240° C. to prepare pressed sheets of 1 mm and 2 mm in thickness. Tests were conducted in the same way as in Example 51. The sample was found to have an Izod impact strength of 2.0 kg.cm/cm, a flexural modulus of 28900 kg/cm$^2$, a stress at flexural yield point of 870 kg/cm$^2$ and a TMA of 111° C. Therefore, it was found that the sample was low in impact resistance and brittle, though it was excellent in rigidity and heat resistance.

EXAMPLES 52 AND 53

The evaluation of blends of the copolymer (A) obtained in Polymerization Example 3 and the styrene-butadiene-styrene block polymer (B) (density: 0.94 g/cm$^3$, Cariflex TR1102, a product of Shell Kagaku KK) in weight ratios of (A)/(B) given in Table 17 was made in the same manner as in Example 51. The results are shown in Table 17. There could be obtained compositions excellent in rigidity and heat resistance as well as high in impact resistance.

EXAMPLE 54

The evaluation of a blend of the copolymer (A) obtained in Polymerization Example 3 and a hydrogenated styrene-butadiene-styrene block copolymer (B) (density: 0.90 g/cm$^3$, Clayton G1657, a product of Shell Kagaku KK) (weight ratio of (A)/(B) being given in Table 17) was made in the same manner as in Example 51. The results are shown in Table 17. There could be obtained a composition excellent in rigidity and heat resistance as well as in impact resistance.

EXAMPLE 55

The evaluation of a blend of the copolymer (A) prepared in Polymerization Example 3 and a styrene-isoprene-styrene block copolymer (B) (density: 0.92 g/cm$^3$, Cariflex TR1107, a product of Shell Kagaku KK) (weight ratio of (A)/(B) being given in Table 17) was made in the same manner as in Example 51. The results are shown in Table 17. There could be obtained a composition excellent in rigidity and heat resistance as well as high in impact resistance.

EXAMPLES 56 AND 57

The evaluation of blends of the copolymer (A) obtained in Polymerization Example 3 and a styrene-butadiene copolymer (B) (density: 0.94 g/cm$^3$, Nipol 1502, a product of Nippon Geon Co., Ltd.) in weight ratios of (A)/(B) given in Table 17 was made in the same manner as in Example 51. The results are shown in Table 17. There could be obtained compositions excellent in rigidity and heat resistance as well as in impact resistance.

EXAMPLE 58

The evaluation of a blend of the copolymer (A) prepared in Polymerization Example 2 and a styrene-butadiene-styrene block copolymer (B) (density: 0.94 g/cm$^3$, Cariflex 1102, a product of Shell Kagaku KK) (weight ratio of (A)/(B) being given in Table 17) was conducted in the same manner as in Example 51. The results are shown in Table 17. There could be obtained a composition excellent in rigidity and heat resistance as well as in impact resistance.

COMPARATIVE EXAMPLE 19

The copolymer (A) prepared in Polymerization Example 2 was compression-molded at 240° C. to prepare pressed sheets of 1 mm and 2 mm in thickness. Test pieces obtained from the sheets were tested. The results are shown in Table 17. The sheets were found to be low in impact resistance and to be brittle, though they were excellent in rigidity and heat resistance.

EXAMPLES 59 AND 60

The evaluation of blends of the copolymer (A) prepared in Polymerization Example 2 and a hydrogenated styrene-butadiene-styrene block copolymer (B) (density: 0.90 g/cm$^3$, Clayton G 1657, a product of Shell Kagaku KK) in weight ratios of (A)/(B) given in Table 17 was conducted in the same manner as in Example 51. The results are shown in Table 17. There could be obtained compositions excellent in rigidity and heat resistance as well as in impact resistance.

EXAMPLES 61 TO 66

The evaluation of blends of a copolymer (A) (composition being given in Table 17) prepared substantially following the procedure of Polymerization Example 1b and a styrene-conjugated diene block copolymer (B) given in Table 17 (weight ratio of (A)/(B) being given in Table 17) was conducted in the same way as in Example 51. The results are shown in Table 17. There could be obtained compositions excellent in rigidity and heat resistance as well as high in impact resistance.

COMPARATIVE EXAMPLES 20 TO 22

The evaluation of copolymers (A) (composition being given in Table 17) prepared substantially following the procedure of polymerization Example 1b was conducted in the same way as in Comparative Example 19. The results are shown in Table 17.

TABLE 17

| | Copolymer (A) | | | | | | | Copolymer (B) | Blending ratio (A)/(B) (weight ratio) | Impact strength (kg·cm/cm) | Flexural modulus (kg/cm²) | Stress at flexural yield point (kg/cm²) | TMA (°C.) |
|---|---|---|---|---|---|---|---|---|---|---|---|---|---|
| | Cyclo-olefin | Third monomer | Composition (mol %) Ethylene | Composition (mol %) Third monomer | [η] (dl/g) | TMA (°C.) | | | | | | | |
| Ex. 51 | [structure] | — | 67 | — | 0.60 | 111 | SBS$^a$ | 90/10 | 5.0 | 23000 | 850 | 111 |
| 52 | " | — | " | — | " | " | " | 80/20 | 14.1 | 19200 | 750 | 110 |
| 53 | " | — | " | — | " | " | " | 70/30 | 25.5 | 16500 | 580 | 109 |
| 54 | " | — | " | — | " | " | SEBS$^b$ | 80/20 | 13.0 | 18800 | 740 | 110 |
| 55 | " | — | " | — | " | " | SIS$^c$ | 80/20 | 11.8 | 17900 | 730 | 110 |
| 56 | " | — | " | — | " | " | SBR$^d$ | 80/20 | 15.1 | 17400 | 690 | 110 |
| 57 | " | — | " | — | " | " | " | 70/30 | 19.1 | 15000 | 430 | 109 |
| 58 | " | — | 58 | — | 0.94 | 170 | SBS$^b$ | 80/20 | 12.3 | 23100 | 900 | 169 |
| 59 | " | — | " | — | " | " | SEBS$^b$ | 80/20 | 7.4 | 23000 | 910 | 168 |
| 60 | " | — | " | — | " | " | " | 70/30 | 12.8 | 20600 | 790 | 168 |
| Comp. Ex. 18 | " | — | 67 | — | 0.60 | 111 | — | 100/0 | 2.0 | 28900 | 870 | 111 |
| Comp. Ex. 19 | " | — | 58 | — | 0.94 | 170 | — | 100/0 | 1.1 | 35000 | 1110 | 170 |
| Ex. 61 | [structure] | Butene | 60 | 0.9 | 0.50 | 155 | SBS$^a$ | 80/20 | 15.3 | 18600 | 720 | 155 |
| 62 | " | " | " | " | " | " | SIS$^c$ | 80/20 | 10.8 | 17900 | 660 | 154 |
| 63 | [CH₃ structure] | — | 62 | — | 0.48 | 154 | SBS | 80/20 | 15.6 | 18300 | 580 | 153 |
| 64 | " | — | " | — | " | " | " | 70/30 | 19.3 | 15400 | 440 | 153 |
| 65 | [CH₃ structure] | Butene | 61 | 1.2 | 0.46 | 148 | SBS | 80/20 | 14.7 | 17700 | 540 | 148 |
| 66 | " | " | " | " | " | " | SEBS$^b$ | 80/20 | 9.6 | 18100 | 570 | 147 |
| Comp. Ex. 20 | [structure] | " | 60 | 0.9 | 0.50 | 155 | — | 100/0 | 1.0 | 31800 | 960 | 155 |

TABLE 17-continued

| | Copolymer (A) | | | | | | Blending ratio (A)/(B) (weight ratio) | Impact strength (kg · cm/cm) | Flexural modulus (kg/cm²) | Stress at flexural yield point (kg/cm²) | TMA (°C.) |
|---|---|---|---|---|---|---|---|---|---|---|---|
| | Cyclo-olefin | Composition (mol %) | | | | Copolymer (B) | | | | | |
| | | Third monomer | Ethylene | Third monomer | [η] (dl/g) | TMA (°C.) | | | | | |
| 21 |  | — | 62 | — | 0.48 | 154 | — | 100/0 | 0.9 | 30500 | 930 | 154 |
| 22 | " | Butene | 61 | 1.2 | 0.46 | 148 | — | 100/0 | 1.1 | 30900 | 930 | 148 |

[a]Styrene-butadiene-styrene block copolymer (density 0.94 g/cm³, Cariflex TR1102, a product of Shell Kagaku KK)
[b]Hydrogenated styrene-butadiene-styrene block copolymer (density 0.90 g/cm³, Clayton G1657, a product of Shell Kagaku KK)
[c]Styrene-isoprene-styrene block copolymer (density 0.92 g/cm³, Cariflex TR1107, a product of Shell Kagaku KK)
[d]Styrene-butadiene rubber (density 0.94 g/cm³, Nipol 1502, a product of Nippon Zeon Co., Ltd.)

EXAMPLE 67

A dry blend of 40 g of the copolymer (A) obtained in Polymerization Example 1b, 5 g of the cycloolefin type random copolymer prepared in Polymerization Example 5 (hereinafter abbreviated to TDR) (B1) and 5 g of ethylene-propylene random copolymer (hereinafter abbreviated to EPR) (B2) containing 80 mol% of ethylene units and having a crystallinity index of 15%, a density of 0.88 g/cm$^3$ and an intrinsic viscosity [$\eta$] of 2.2 dl/g (weight ratio=80/10/10) was incorporated with 0.5% and 0.3%, based on the total weight of the resins (A) and (B), of tetrakis[methylene-3-(3,5-di-t-butyl-4-hydroxyphenyl)-propionate]methane and dilauryl thiodipropionate, respectively. The blend was kneaded at 190° C. by using Brabender Plastograph and compression-molded at 240° C. to prepare pressed sheets of 1 mm and 2 mm in thickness. Test pieces were punched out of these sheets and impact test, flexural test and TMA measurement were conducted.

The blend was found to have an Izod impact strength of 40.2 kg.cm/cm, a flexural modulus of 19000 kg/cm$^2$ and a TMA of 110° C. There could be obtained a blend excellent in rigidity and heat resistance as well as in impact strength.

COMPARATIVE EXAMPLE 23

The copolymer (A) prepared in Polymerization Example 3 was compression-molded at 240° C. to prepare pressed sheets of 1 mm and 2 mm in thickness. The sheets were tested in the same manner as in Example 67.

The sample was found to have an IZ impact strength of 2.0 kg.cm/cm, a flexural modulus of 28900 kg/cm$^2$, stress at flexural yield point of 870 kg/cm$^2$ and a TMA of 110° C. The sample was found to be low in impact resistance and to be brittle, though it was excellent in rigidity and heat resistance.

EXAMPLE 68

The evaluation of a blend of the copolymer (A) obtained in Polymerization Example 3, TDR (B1) and a styrene-butadiene-styrene block copolymer (hereinafter abbreviated to SBS) (B2) (density: 0.94 g/cm$^2$, Cariflex TR1102, a product of Shell Kagaku KK) (weight ratio being given in Table 18) was conducted in the same manner as in Example 67. The results are shown in Table 18. There could be obtained a composition excellent in rigidity and heat resistance as well as high in impact resistance.

EXAMPLE 69

The evaluation of a blend of the copolymer (A) prepared in Polymerization Example 3, an ethylenepropylene-diene copolymer (hereinafter abbreviated to EPDM) (B2) (ethylene/propylene/5-ethylidene-2-norbornene=66/31/3 mol%, [$\eta$]=2.1 dl/g, iodine value: 22, density: 0.87 g/cm$^2$) was conducted in the same manner as in Example 67, the weight ratio of (A)/(B1)/(B2) being given in Table 18. The results are shown in Table 18. The results are shown in Table 18. There could be obtained a composition excellent in rigidity and heat resistance as well as in impact resistance.

EXAMPLES 70 TO 72

The evaluation of blends of the copolymer (A) prepared in Polymerization Example 3, EPR (B1) and SBS (B2) in weight ratios given in Table 18 was conducted in the same manner as in Example 67. There could be obtained compositions excellent in rigidity and heat resistance as well as in impact strength.

EXAMPLES 73 TO 77

The evaluation of blends of the copolymer (A) prepared in Polymerization Example 2, EPDM (B1) and SBS (B2) in weight ratios given in Table 18 was conducted in the same manner as in Example 67. The results are shown in Table 18. There were obtained compositions excellent in rigidity and heat resistance as well as in impact strength.

COMPARATIVE EXAMPLE 24

The evaluation of the copolymer (A) prepared in Polymerization Example 2 was made in the same manner as in Comparative Example 23. The results are shown in Table 18. The sample was found to be low in impact resistance and to be brittle, though it was excellent in rigidity and heat resistance.

EXAMPLES 78 TO 80

The evaluation of blends of a copolymer (A) indicated in Table 18 which had been prepared substantially following the procedure of Polymerization Example 1b, EPR (B1) and EPDM (B2) in weight ratios given in Table 18 was conducted in the same manner as in Example 67. The results are shown in Table 18. There were obtained compositions excellent in rigidity and heat resistance as well as high in impact resistance.

EXAMPLES 81 AND 82

The evaluation of blends of a copolymer (A) indicated in Table 18 which had been prepared substantially following the procedure of Polymerization Example 1b, EPDM (B1) and SBS (B2) in weight ratios given in Table 18 was conducted in the same way as in Example 67. The results are shown in Table 18. There were obtained compositions excellent in rigidity and heat resistance as well as high in impact resistance.

EXAMPLES 83 and 84

The evaluation of blends of a copolymer (A) indicated in Table 18 which has been prepared substantially following the procedure of Polymerization Example 1b, TDR (B1) and SBS (B2) in weight ratios given in Table 18 was conducted in the same way as in Example 67. The results are shown in Table 18. There were obtained compositions excellent in rigidity and heat resistance as well as high in impact resistance.

COMPARATIVE EXAMPLES 25 TO 27

The evaluation of copolymers (A) indicated in Table 18 which had been prepared substantially following the procedure of Polymerization Example 1b was conducted in the same manner as in Comparative Example 23. The results are shown in Table 18. They were found to be low in impact strength and to be brittle, though they were excellent in rigidity and heat resistance.

TABLE 18

| | Cyclo-olefin | Copolymer (A) Composition (mol %) Third monomer | Ethylene | Third monomer | [η] (dl/g) | TMA (°C.) | Copolymer (B) B1 | Copolymer (B) B2 | Blending ratio (A)/(B1)/(B2) (weight ratio) | Impact strength (kg·cm/cm) | Flexural modulus (kg/cm²) | Stress at flexural yield point (kg/cm²) | TMA (°C.) |
|---|---|---|---|---|---|---|---|---|---|---|---|---|---|
| Ex. 67 | [structure 1] | — | 67 | — | 0.60 | 111 | TDR | EPR | 80/10/10 | 40.2 | 19000 | 610 | 110 |
| 68 | " | — | " | — | " | " | — | SBS | " | 54.1 | 17700 | 520 | 109 |
| 69 | " | — | " | — | " | " | EPDM | " | 80/5/15 | 52.1 | 17500 | 530 | 109 |
| 70 | " | — | " | — | " | " | EPR | " | 80/10/10 | 51.9 | 18100 | 530 | 109 |
| 71 | " | — | " | — | " | " | " | " | 80/15/5 | 54.5 | 17800 | 520 | 109 |
| 72 | " | — | " | — | " | " | " | " | 80/5/15 | 49.5 | 17200 | 490 | 109 |
| 73 | " | — | 58 | — | 0.94 | 170 | EPDM | " | 80/5/15 | 21.1 | 20500 | 810 | 168 |
| 74 | " | — | " | — | " | " | " | " | 80/10/10 | 25.1 | 21100 | 820 | 169 |
| 75 | " | — | " | — | " | " | " | " | 80/15/5 | 24.2 | 21400 | 830 | 169 |
| 76 | " | — | " | — | " | " | " | " | 90/5/5 | 5.3 | 24100 | 850 | 169 |
| 77 | " | — | " | — | " | " | " | " | 70/15/15 | 28.5 | 18100 | 690 | 168 |
| 78 | " | Butene | 60 | 0.9 | 0.50 | 155 | EPR | EPDM | 80/10/10 | 26.3 | 17300 | 520 | 154 |
| 79 | " | " | " | " | " | " | " | " | " | 16.5 | 20500 | 710 | 154 |
| 80 | " | " | " | " | " | " | " | " | 90/5/5 | 5.5 | 23800 | 820 | 154 |
| 81 | [structure 2 CH₃] | — | 62 | — | 0.48 | 154 | EPDM | SBS | 80/10/10 | 15.4 | 20200 | 680 | 154 |
| 82 | " | Butene | 61 | 1.2 | 0.46 | 148 | " | " | 70/15/15 | 23.8 | 17200 | 510 | 154 |
| 83 | " | " | " | " | " | " | TDR | " | 80/10/10 | 15.7 | 20900 | 710 | 147 |
| 84 | " | " | " | " | " | " | " | " | 70/15/15 | 25.7 | 18200 | 700 | 147 |
| Comp. Ex. 23 | [structure 3] | — | 67 | — | 0.60 | 111 | — | — | — | 2.0 | 28900 | 870 | 111 |
| 24 | " | Butene | 58 | 0.9 | 0.94 | 170 | — | — | — | 1.1 | 35000 | 1110 | 170 |
| 25 | " | " | 60 | " | 0.50 | 155 | — | — | — | 1.0 | 31800 | 960 | 155 |
| 26 | [structure 4 CH₃] | — | 62 | — | 0.48 | 154 | — | — | — | 0.9 | 30500 | 930 | 154 |
| 27 | " | Butene | 61 | 1.2 | 0.46 | 148 | — | — | — | 1.1 | 30900 | 930 | 148 |

In the following examples, (1) Asahi Fiber Glass glass roving chopped strand GR-S-3A (GF) or (2) Fujimi white alumina #4000 (WA) was used as the filler (C).

EXAMPLE 85

The copolymer (A) prepared in Polymerization Example 3 was dry-blended with a copolymer (B) given in Table 19, prepared substantially following the procedure of Polymerization Example 3 in a weight ratio of 80/10. The dry blend was incorporated with 0.5% and 0.3%, based on the total weight of the resins (A) and (B), of tetrakis [methylene-3-(3,5-di-t-butyl-4-hydroxyphenyl)propionate]methane and dilauryl thiodipropionate as stabilizers, respectively. The dry blend was kneaded at 220° C. in a 30 mmφ twin-screw extruder and dry-blended with 10% by weight, based on the total amount of the resins (A) and (B), of GF. The resulting blend was kneaded at 220° C. in a 30 mmφ twin-screw extruder and compression-molded at 240° C. to prepare pressed sheets of 1 mm and 2 mm in thickness. Test pieces were punched out of these sheets and subjected to impact test, flexural test and TMA measurement.

The blend was found to have a notched Izod impact strength of 6 kg.cm/cm, an initial flexural modulus of 31000 kg/cm$^2$ and a TMA of 113° C. There was obtained a blend excellent in rigidity, heat resistance and impact strength.

COMPARATIVE EXAMPLE 28

The copolymer (A) obtained in Polymerization Example 3 was compression-molded at 240° C. to prepare pressed sheets of 1 mm and 2 mm in thickness. Test pieces were prepared from these sheets and subjected to impact test, flexural test and TMA measurement.

The test pieces were found to have a notched Izod impact strength of 2 kg.cm/cm, an initial flexural modulus of 28900 kg/cm$^2$ and a TMA of 111° C. Therefore, the sample was inferior in impact strength, initial flexural modulus and heat resistance as compared with the blend of Example 85.

EXAMPLES 86 AND 87

The evaluation of blends of copolymers (A) and (B) and filler (C) given in Table 19 in blending ratios given in Table 19 was conducted in the same manner as in Example 85. The results are shown in Table 19. There were obtained compositions excellent in rigidity, heat resistance and impact strength.

EXAMPLES 88 TO 90

The evaluation of blends of copolymers (A) and (B) and filler (C) given in Table 19 in blending ratios given in Table 19 was conducted in the same manner as in Example 85. The results are shown in Table 19. There were obtained compositions excellent in rigidity, heat resistance and impact strength.

COMPARATIVE EXAMPLE 29

The evaluation of the copolymer (A) given in Table 19 was conducted in the same manner as in Comparative Example 28. The results are shown in Table 19. The sample was inferior to the blends of Examples 88 to 90 in rigidity, heat resistance and impact strength.

EXAMPLES 91 TO 93

The evaluation of blends of copolymers (A) and (B) and filler (C) given in Table 19 in blending ratios given in Table 19 was conducted in the same manner as in Example 85. The results are shown in Table 19. There were obtained compositions excellent in rigidity, heat resistance and impact strength.

COMPARATIVE EXAMPLE 30

The evaluation of the copolymer (A) given in Table 19 was conducted in the same manner as in Comparative Example 28. The results are shown in Table 19. The sample was inferior to the compositions of Examples 91 to 93 in rigidity, heat resistance and impact strength.

TABLE 19

| | Copolymer (A) | | | | | | Copolymer (B) | | | | | | Filler (C) |
|---|---|---|---|---|---|---|---|---|---|---|---|---|---|
| | Cyclo-olefin | Composition (mol %) | | [η] (dl/g) | TMA (°C.) | | Cyclo-olefin | Composition (mol %) | | [η] (dl/g) | TMA (°C.) | | |
| | | Third monomer | Ethylene | | | | | Third monomer | Ethylene | Third monomer | | | |
| Ex. 85 | (dimethano-octahydronaphthalene) | — | 67 | 0.60 | 111 | | (dimethano-octahydronaphthalene) | Propylene | 69 | 21 | 1.44 | −4 | GF |
| 86 | " | " | " | " | " | | " | " | " | " | " | " | " |
| 87 | " | " | " | " | " | | " | " | " | " | " | " | " |
| Comp. Ex. 28 | " | " | " | " | " | | — | — | — | — | — | — | — |
| Ex. 88 | " | Butene | 60 | 0.50 | 155 | | (methyl-substituted cycloolefin) | Butene | 72 | 18 | 0.86 | −6 | WA |
| 89 | " | " | " | " | " | | " | " | " | " | " | " | " |
| 90 | " | " | " | " | " | | " | " | " | " | " | " | " |
| Comp. Ex. 29 | " | " | " | " | " | | — | — | — | — | — | — | — |
| Ex. 91 | (methyl-substituted dimethano-octahydronaphthalene) | Butene | 61 | 0.46 | 148 | | (dimethano-octahydronaphthalene) | Butene | 74 | 18 | 0.82 | −8 | GF |
| 92 | " | " | " | " | " | | " | " | " | " | " | " | " |
| 93 | " | " | " | " | " | | " | " | " | " | " | " | " |
| Comp. Ex. 30 | " | " | " | " | " | | — | — | — | — | — | — | — |

| | Blending ratio (A)/(B)/(C) weight ratio | Izod impact strength (kg·cm/cm) | Initial flexural modulus (kg/cm²) | Stress at flexural yield point (kg/cm²) | TMA (°C.) |
|---|---|---|---|---|---|
| Ex. 85 | 80/10/10 | 6 | 31000 | 730 | 113 |
| 86 | 70/10/20 | 6 | 33900 | 650 | 115 |
| 87 | 60/10/30 | 7 | 37500 | 560 | 120 |
| Comp. Ex. 28 | 100/0/0 | 2 | 28900 | 870 | 111 |
| Ex. 88 | 80/10/10 | 5 | 34600 | 700 | 158 |
| 89 | 70/10/20 | 5 | 37800 | 720 | 161 |
| 90 | 60/10/30 | 4 | 41400 | 650 | 164 |
| Comp. Ex. 29 | 100/0/0 | 1.0 | 31800 | 960 | 155 |
| Ex. 91 | 85/5/10 | 6 | 37800 | 730 | 151 |
| 92 | 75/5/20 | 7 | 34100 | 750 | 153 |
| 93 | 65/5/30 | 6 | 42300 | 690 | 157 |
| Comp. Ex. 30 | 100/0/0 | 1.1 | 30900 | 930 | 148 |

EXAMPLE 94

The copolymer (A) obtained in Polymerization Example 3 was dry-blended with an ethylene propylene random copolymer (B) (ethylene/propylene=80/20 mol%) in a weight ratio of 80/10. The dry blend was incorporated with 0.5% and 0.3%, based on the total weight of the resins (A) and (B), of tetrakis [methylene-3-(3,5-di-t-butyl-4-hydroxyphenyl)propionate] methane and dilauryl thiodipropionate as stabilizers, respectively. The resulting blend was kneaded at 220° C. in a 30 mm$\phi$ twin-screw extruder and dry-blended with 10% by weight, based on the total amount of the resins (A) and (B), of GF. The resulting blend was kneaded at 240° C. in a 30 mm$\phi$ twin-screw extruder and compression-molded at 240° C. to prepare pressed sheets of 1 mm and 2 mm in thickness. Test pieces were prepared from these sheets and subjected to impact test, flexural test and TMA measurement.

The blend was found to have a notched Izod impact strength of 7 kg.cm/cm, an initial flexural modulus of 30600 kg/cm$^2$ and a TMA of 114° C. There was obtained a blend excellent in rigidity, heat resistance and impact strength.

COMPARATIVE EXAMPLE 31

The copolymer (A) prepared in Polymerization Example 3 was compression-molded at 240° C. to prepare pressed sheets of 1 mm and 2 mm in thickness. Test pieces were cut out of these sheets and subjected to impact test, flexural test and TMA measurement.

The test pieces were found to have a notched Izod impact strength of 2 kg.cm/cm, an initial flexural modulus of 28900 kg/cm$^2$ and a TMA of 110° C. The sample was inferior to the blend of Example 94 in impact strength, initial flexural modulus and heat resistance.

EXAMPLES 95 AND 96

The evaluation of blends of copolymers (A) and (B) and filler (C) given in Table 20 in blending ratios given in Table 20 was conducted in the same manner as in Example 94. The results are shown in Table 20. There were obtained compositions excellent in rigidity, heat resistance and impact strength.

EXAMPLES 97 TO 99

The evaluation of blends of copolymers (A) and (B) and filler (C) given in Table 20 blending ratios given in Table 20 was conducted in the same manner as in Example 94. The results are shown in Table 20. There were obtained compositions excellent in rigidity, heat resistance and impact strength.

COMPARATIVE EXAMPLE 32

The evaluation of copolymer (A) given in Table 20 was conducted in the same manner as in Comparative Example 31. The results are shown in Table 20. The sample was inferior to the blends of Examples 97 to 99 in rigidity, heat resistance and impact strength.

EXAMPLES 100 TO 102

The evaluation of blends of copolymers (A) and (B) and filler (C) given in Table 20 in blending ratios given in Table 20 was conducted in the same manner as in Example 94. The results are shown in Table 20. There were obtained compositions excellent in rigidity, heat resistance and impact strength.

COMPARATIVE EXAMPLE 33

The evaluation of copolymer (A) given in Table 20 was conducted in the same manner as in Comparative Example 31. The results are shown in Table 20. The sample was inferior to the blends of Examples 100 to 102 in rigidity, heat resistance and impact strength.

TABLE 20

| | Copolymer (A) | | | | | Copolymer (B) | | | | | | Filler |
|---|---|---|---|---|---|---|---|---|---|---|---|---|
| | Cyclo-olefin | Third monomer | Composition (mol %) Ethylene | Composition (mol %) Third monomer | [η] (dl/g) | TMA (°C.) | Composition (mol %) Ethylene | Composition (mol %) Propylene | Composition (mol %) Butene | [η] (dl/g) | Crystallinity index (%) | Density (g/cm³) | (C) |
| Ex. 94 | ⬡⬡ | — | 67 | — | 0.60 | 111 | 80 | 20 | — | 2.6 | 5 | 0.88 | GF |
| 95 | " | " | " | " | " | " | " | " | " | " | " | " | " |
| 96 | " | " | " | " | " | " | " | " | " | " | " | " | " |
| Comp. Ex. 31 | " | " | " | " | " | " | " | " | " | " | " | " | — |
| Ex. 97 | ⬡⬡ | Butene | 60 | 0.9 | 0.50 | 155 | 90 | — | 10 | 1.4 | 10 | 0.89 | WA |
| 98 | " | " | " | " | " | " | " | " | " | " | " | " | " |
| 99 | " | " | " | " | " | " | " | " | " | " | " | " | " |
| Comp. Ex. 32 | " | " | " | " | " | " | " | " | " | " | " | " | — |
| Ex. 100 | ⬡⬡-CH₃ | Butene | 61 | 1.2 | 1.2 | 148 | — | 70 | 30 | 2.1 | 20 | 0.88 | GF |
| 101 | " | " | " | " | " | " | " | " | " | " | " | " | " |
| 102 | " | " | " | " | " | " | " | " | " | " | " | " | " |
| Comp. Ex. 33 | " | " | " | " | " | " | " | " | " | " | " | " | — |

| | Blending ratio (A)/(B)/(C) weight ratio | Izod impact strength (kg·cm/cm) | Initial flexural modulus (kg/cm²) | Stress at flexural yield point (kg/cm²) | TMA (°C.) |
|---|---|---|---|---|---|
| Ex. 94 | 80/10/10 | 7 | 30600 | 720 | 114 |
| 95 | 70/10/20 | 8 | 33700 | 640 | 116 |
| 96 | 60/10/30 | 6 | 37400 | 550 | 119 |
| Comp. Ex. 31 | 100/0/0 | 2 | 28900 | 870 | 111 |
| Ex. 97 | 80/10/10 | 5 | 33500 | 690 | 158 |
| 98 | 70/10/20 | 4 | 36900 | 710 | 162 |
| 99 | 60/10/30 | 4 | 40900 | 700 | 164 |
| Comp. Ex. 32 | 100/0/0 | 1 | 31800 | 960 | 155 |
| Ex. 100 | 80/10/10 | 5 | 32200 | 710 | 152 |
| 101 | 70/10/20 | 4 | 33500 | 760 | 154 |
| 102 | 60/10/30 | 4 | 42100 | 690 | 157 |
| Comp. Ex. 33 | 100/0/0 | 1.1 | 30900 | 930 | 148 |

EXAMPLE 103

The copolymer (A) obtained in Polymerization Example 3 was dry-blended with an ethylene propylene 5-ethylidene-2-norbornene random copolymer (B) (ethylene/propylene/diene=66/31/3 mol%) in a weight ratio of 80/10. The dry blend was incorporated with 0.5% and 0.3%, based on the total weight of the resins (A) and (B), of tetrakis [methylene-3-(3,5-di-t-butyl-4-hydroxyphenyl) propionate] methane and dilauryl thiodipropionate as stabilizers, respectively. The resulting blend was dry-blended with 10% by weight, based on the total amount of the resins (A) and (B), of GF. The thus-formed dry blend was kneaded at 220° C. in a 30 mm$\phi$ twin-screw extruder and compression molded at 240° C. to prepare pressed sheets of 1 mm and 2 mm in thickness. Test pieces were cut out from these sheets and subjected to impact test, flexural test and TMA measurement.

The blend was found to have a notched Izod impact strength of 8 kg.cm/cm, an initial flexural modulus of 31100 kg/cm$^2$ and a TMA of 114° C. There was obtained a blend excellent in rigidity, heat resistance and impact strength.

COMPARATIVE EXAMPLE 34

The copolymer (A) obtained in Polymerization Example 3 was compression-molded at 240° C. to prepare pressed sheets of 1 mm and 2 mm in thickness. Test pieces were prepared from these sheets and subjected to impact test, flexural test and TMA measurement.

The sample was found to have a notched Izod impact strength of 2 kg.cm/cm, an initial flexural modulus of 28900 kg/cm$^2$ and a TMA of 111° C. The sample was inferior to the blend of Example 103 in rigidity, initial flexural modulus and heat resistance.

EXAMPLES 104 AND 105

The evaluation of blends of copolymers (A) and (B) and filler (C) given in Table 21 in weight ratios given in Table 21 was conducted in the same manner as in Example 103. The results are shown in Table 21. There were obtained compositions excellent in rigidity, heat resistance and impact strength.

EXAMPLES 106 TO 108

The evaluation of blends of copolymers (A) and (B) and filler (C) given in Table 21 in weight ratios given in Table 21 was conducted in the same manner as in Example 103. The results are shown in Table 21. There were obtained compositions excellent in rigidity, heat resistance and impact strength.

COMPARATIVE EXAMPLE 35

The evaluation of the copolymer (A) given in Table 21 was conducted in the same manner as in Comparative Example 34. The results are shown in Table 21. The sample was inferior to the compositions of Examples 106 to 108 in rigidity, heat resistance and impact strength.

EXAMPLES 109 TO 111

The evaluation of blends of copolymers (A) and (B) and filler (C) given in Table 21 in blending ratios given in Table 21 was made in the same manner as in Example 103. The results are shown in Table 21. There were obtained compositions excellent in rigidity, heat resistance and impact strength.

COMPARATIVE EXAMPLE 36

The evaluation of the copolymer (A) given in Table 21 was conducted in the same manner as in Comparative Example 34. The results are shown in Table 21. The sample was inferior to the compositions of Examples 109 to 111 in rigidity, heat resistance and impact strength.

TABLE 21

| | Copolymer (A) | | | | | | Copolymer (B) | | | | | | |
|---|---|---|---|---|---|---|---|---|---|---|---|---|---|
| | Cyclo-olefin | Third monomer | Composition (mol %) Ethylene | Third monomer | [η] (dl/g) | TMA (°C.) | Diene monomer | Composition (mol %) Ethylene | Propylene | [η] (dl/g) | Iodine value | Crystallinity index² (%) | Density¹ (g/cm³) |
| Ex. 103 | (structure 1) | — | 67 | — | 0.60 | 111 | (diene 1) | 66 | 31 | 2.1 | 22 | 0 | 0.87 |
| 104 | " | — | " | — | " | " | " | " | " | " | " | " | " |
| 105 | " | — | " | — | " | " | " | " | " | " | " | " | " |
| Comp. Ex. 34 | " | — | " | — | " | " | — | — | — | — | — | — | — |
| Ex. 106 | (structure 2) | Butene | 60 | 0.9 | 0.50 | 155 | (diene 2) | 67 | 32 | 2.1 | 10 | 0 | 0.87 |
| 107 | " | " | " | " | " | " | " | " | " | " | " | " | " |
| 108 | " | " | " | " | " | " | " | " | " | " | " | " | " |
| Comp. Ex. 35 | " | " | " | " | " | " | — | — | — | — | — | — | — |
| Ex. 109 | (structure 3 with CH₃) | Butene | 61 | 1.2 | 0.46 | 148 | (diene 3) | 67 | 31 | 2.1 | 13 | 0 | 0.87 |
| 110 | " | " | " | " | " | " | " | " | " | " | " | " | " |
| 111 | " | " | " | " | " | " | " | " | " | " | " | " | " |
| Comp. Ex. 36 | " | " | " | " | " | " | — | — | — | — | — | — | — |

| | Filler (C) | Blending ratio (A)/(B)/(C) weight ratio | Izod impact strength (kg·cm/cm) | Initial flexural modulus (kg/cm²) | Stress at flexural yield point (kg/cm²) | TMA (°C.) |
|---|---|---|---|---|---|---|
| Ex. 103 | GF | 80/10/10 | 8 | 31100 | 720 | 114 |
| 104 | " | 70/10/20 | 7 | 33800 | 650 | 117 |
| 105 | " | 60/10/30 | 7 | 37500 | 570 | 118 |
| Comp. Ex. 34 | | 100/0/0 | 2 | 28900 | 870 | 111 |
| Ex. 106 | WA | 80/10/10 | 4 | 33200 | 680 | 157 |
| 107 | " | 70/10/20 | 3 | 36300 | 680 | 159 |
| 108 | " | 60/10/30 | 3 | 40000 | 710 | 163 |
| Comp. Ex. 35 | | 100/0/0 | 1 | 31800 | 960 | 155 |
| Ex. 109 | GF | 80/10/10 | 5 | 36500 | 700 | 150 |
| 110 | " | 70/10/20 | 4 | 33800 | 730 | 155 |
| 111 | " | 60/10/30 | 3 | 41000 | 710 | 159 |
| Comp. Ex. 36 | | 100/0/0 | 1.1 | 30900 | 930 | 148 |

EXAMPLE 112

The copolymer (A) obtained in Polymerization Example 3 was dry-blended with a styrene butadiene styrene copolymer (B) (density: 0.94 g/cm$^3$, Cariflex TR1102, a product of Shell Kagaku KK) in a weight ratio of 80/10. The dry blend was incorporated with 0.5% and 0.3%, based on the total weight of the resins (A) and (B), of tetrakis [methylene-3-(3,5-di-t-butyl-4-hydroxyphenyl)-propionate] methane and dilauryl thiodipropionate as stabilizers, respectively. The resulting blend was kneaded at 220° C. in a 30 mm$\phi$ twin-screw extruder and dry-blended with 10% by weight, based on the total amount of the resins (A) and (B), of GF. The thus formed dry blend was then kneaded at 220° C. in a 30 mm$\phi$ twin-screw extruder and compression-molded at 240° C. to prepare pressed sheets of 1 mm and 2 mm in thickness. Test pieces were cut out from these sheets and subjected to impact test, flexural test and TMA measurement.

The composition was found to have a notched Izod impact strength of 8 kg.cm/cm, an initial flexural modulus of 31000 kg/cm$^2$ and a TMA of 115° C. There was obtained a composition excellent in rigidity, heat resistance and impact strength.

COMPARATIVE EXAMPLE 37

The copolymer (A) obtained in Polymerization Example 3 was compression-molded at 240° C. to prepare pressed sheets of 1 mm and 2 mm in thickness. Test pieces were cut out of these sheets and subjected to impact test, flexural test and TMA measurement.

The test pieces were found to have a notched Izod impact strength of 2 kg.cm/cm, an initial flexural modulus of 28900 kg/cm$^2$ and a TMA of 111° C. The sample was inferior to the blend of Example 112 in impact strength, initial flexural modulus and heat resistance.

EXAMPLES 113 AND 114

The evaluation of blends of copolymers (A) and (B) and the filler (C) given in Table 22 in blending ratios given in Table 22 was conducted in the same manner as in Example 112. The results are shown in Table 22. There were obtained compositions excellent in rigidity, heat resistance and impact strength.

EXAMPLES 115 TO 117

The evaluation of blends of copolymers (A) and (B) and the filler (C) given in Table 22 in blending ratios given in Table 22 was conducted in the same manner as in Example 112. The results are shown in Table 22. There were obtained compositions excellent in rigidity, heat resistance and impact strength.

COMPARATIVE EXAMPLE 38

The evaluation of the copolymer (A) given in Table 22 was conducted in the same manner as in Comparative Example 37. The results are shown in Table 22. The sample was inferior to the compositions of Examples 115 to 117 in rigidity, heat resistance and impact strength.

TABLE 22

| | Copolymer (A) | | | | | | Copolymer (B) | Filler (C) | Blending ratio (A)/(B)/(C) (weight ratio) | IZ impact strength (kg·cm/cm) | Initial flexural modulus (kg/cm²) | Stress at flexural yield point (kg/cm²) | TMA (°C) |
|---|---|---|---|---|---|---|---|---|---|---|---|---|---|
| | Cycloolefin | Third monomer | Composition (mol %) Ethylene | Third monomer | [η] (dl/g) | TMA (°C) | | | | | | | |
| Ex. 112 | (structure) | — | 67 | — | 0.60 | 111 | SBS[a] | GF | 80/10/10 | 8 | 31000 | 730 | 115 |
| 113 | " | — | " | — | " | " | " | " | 70/10/20 | 6 | 33900 | 680 | 119 |
| 114 | " | — | " | — | " | " | " | WA | 80/10/10 | 7 | 30800 | 700 | 114 |
| Comp. Ex. 37 | " | — | " | — | " | " | — | — | 100/0/0 | 2 | 28900 | 870 | 111 |
| Ex. 115 | (structure with CH₃) | Butene | 61 | 1.2 | 0.46 | 148 | SEBS[b] | GF | 80/10/10 | 4 | 32500 | 620 | 153 |
| 116 | " | " | " | " | " | " | SBR[c] | " | 80/10/10 | 7 | 32100 | 730 | 153 |
| 117 | " | " | " | " | " | " | SIS[d] | WA | 80/10/10 | 4 | 32300 | 590 | 151 |
| Comp. Ex. 38 | " | " | " | " | " | " | — | — | 100/0/0 | 1.1 | 30900 | 930 | 148 |

[a]Styrene-butadiene-styrene block copolymer (density 0.94 g/cm³, Cariflex TR1102, a product of Shell Kagaku KK)
[b]Hydrogenated styrene-butadiene-styrene block copolymer (density 0.90 g/cm³, Clayton G1657, a product of Shell Kagaku KK)
[c]Styrene-butadiene rubber (density 0.94 g/cm³, Nipol 1502, a product of Nippon Zeon Co., Ltd.)
[d]Styrene-isoprene-styrene block copolymer (density 0.92 g/cm³, Cariflex TR1107, a product of Shell Kagaku KK)

EXAMPLE 118

A dry blend of the copolymer (A) obtained in Polymerization Example 3, the cycloolefin type random copolymer (B1) obtained in Polymerization Example 5 (hereinafter abbreviated to TDR) and an ethylene-propylene random copolymer (B2) (hereinafter abbreviated to EPR) containing an ethylene unit of 80 mol% and having a crystallinity index of 5%, a density of 0.88 g/cm$^3$ and an intrinsic viscosity $[\eta]$ of 2.2 dl/g (weight ratio=80/5/5), was incorporated with 0.5% and 0.3%, based on the total weight of the resins (A), (B1) and (B2), of tetrakis [methylene-3-(3,5-di-t-butyl-4-hydroxyphenyl)propionate]methane and dilauryl thiodipropionate as stabilizers, respectively. The dry blend was dry-blended with 10% by weight, based on the total amount of the resins (A), (B1) and (B2), of GF. The resulting blend was kneaded at 220° C. in a 30 mm$\phi$ twin-screw extruder and compression-molded at 240° C. to prepare pressed sheets of 1 mm and 2 mm in thickness. Test pieces were cut out from these sheets and subjected to impact test, flexural test and TMA measurement.

The composition was found to have a notched Izod impact strength of 6 kg.cm/cm, an initial flexural modulus of 30900 kg/cm$^2$ and a TMA of 114° C. There was obtained a composition excellent in rigidity, heat resistance and impact resistance.

COMPARATIVE EXAMPLE 39

The evaluation of the copolymer (A) obtained in Polymerization Example 3 was compression molded at 240° C. to prepare pressed sheets of 1 mm and 2 mm in thickness. Test pieces were punched out of these sheets and subjected to impact test, flexural test and TMA measurement.

The sample was found to have a notched Izod impact strength of 2kg.cm/cm, an initial flexural modulus of 28900 kg/cm$^2$ and a TMA of 111° C. The sample was inferior to the blend of Example 118 in impact strength, initial flexural modulus and heat resistance.

EXAMPLE 119

A blend of the copolymer (A) obtained in Polymerization Example 3 and given in Table 23, TDR (B1), a styrene-butadiene-styrene block copolymer (hereinafter abbreviated SBS) (B2) (density: 0.94 g/cm$^3$, Cariflex TR1102, a product of Shell Kagaku KK) and GF in a ratio given in Table 23 was processed and evaluated in the same manner as in Example 118. The results are shown in Table 23. There was obtained a composition excellent in rigidity, heat resistance and impact resistance.

EXAMPLE 120

A blend of the copolymer (A) obtained in Polymerization Example 3, an ethylene-propylene-diene copolymer (hereinafter abbreviated to EPDM) (B1) (ethylene/propylene/5-ethylidene-2-norbornene=66/31/3 mol%, $[\eta]$=2.1 dl/g, iodine value: 22, density: 0.87 g/cm$^3$), SBS (B2) and GF in a blending ratio given in Table 23 was processed and evaluated in the same manner as in Example 118. The results are shown in Table 23. There was obtained a composition excellent in rigidity, heat resistance and impact resistance.

EXAMPLES 121 TO 123

Blends of a copolymer (A) given in Table 23, which had been prepared substantially following the procedure of Polymerization Example 3, copolymers (B1) and (B2) given in Table 23 and filler (C) in blending ratios given in Table 23 were processed and evaluated in the same manner as in Example 118. The results are shown in Table 23. There were obtained compositions excellent in rigidity, heat resistance and impact resistance.

COMPARATIVE EXAMPLE 40

The evaluation of the copolymer (A) given in Table 23 was conducted in the same manner as in Comparative Example 39. The results are shown in Table 23. The sample was inferior to the compositions of Examples 121 to 123 in rigidity, heat resistance and impact strength.

TABLE 23

| | Copolymer (A) | | | | | | Copolymer (B) | | |
|---|---|---|---|---|---|---|---|---|---|
| | Cycloolefin | Third monomer | Composition (mol %) | | $[\eta]$ (dl/g) | TMA (°C.) | B1 | B2 | Filler |
| | | | Ethylene | Third monomer | | | | | |
| Ex. 118 | 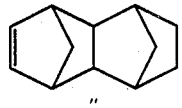 | — | 67 | — | 0.60 | 111 | TDR | EPR | GF |
| 119 | " | — | " | — | " | " | " | SBS | " |
| 120 | " | — | " | — | " | " | EPDM | " | " |
| Comp. Ex. 39 | " | — | " | — | " | " | — | — | — |
| Ex. 121 | 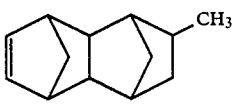 | Butene | 61 | 1.2 | 0.46 | 148 | EPDM | EPR | WA |
| 122 | " | " | " | " | " | " | " | TDR | " |
| 123 | " | " | " | " | " | " | EPR | SBS | " |
| Comp. Ex. 40 | " | " | " | " | " | " | — | — | — |

| | Blending ratio (A)/B1/B2/(C) weight ratio | Izod impact strength (kg · cm/cm) | Initial flexural modulus (kg/cm$^2$) | Stress at flexural yield point (kg/cm$^2$) | TMA (°C.) |
|---|---|---|---|---|---|
| Ex. 118 | 80/5/5/10 | 6 | 30900 | 730 | 114 |
| 119 | 80/5/5/10 | 7 | 31100 | 660 | 115 |
| 120 | 70/5/5/20 | 8 | 34200 | 570 | 119 |
| Comp. Ex. 39 | 100/0/0/0 | 2.0 | 28900 | 870 | 111 |

TABLE 23-continued

| | | | | | |
|---|---|---|---|---|---|
| Ex. 121 | 80/5/5/10 | 5 | 33600 | 730 | 150 |
| 122 | 80/5/5/10 | 5 | 33900 | 720 | 151 |
| 123 | 80/5/5/10 | 4 | 32800 | 730 | 155 |
| Comp. Ex. 40 | — | 1.1 | 30900 | 930 | 148 |

What is claimed is:

1. A cycloolefin type random copolymer composition characterized by comprising
   (A) a cycloolefin type random copolymer containing an ethylene component and a cycloolefin component represented by the following general formula [I] or [II] and having an intrinsic viscosity [η] of 0.05–10 dl/g as measured at 135° C. in decalin and a softening temperature (TMA) of not lower than 70° C., and
   (B) one or more non-rigid copolymers selected from the group consisting of:
      (i) a cycloolefin type random copolymer containing an ethylene component, at least one other α-olefin component and a cycloolefin component represented by the following general formula [I] or [II] and having an intrinsic viscosity [η] of 0.01–10 dl/g as measured at 135° C. in decalin and a softening temperature (TMA) of below 70° C.,
      (ii) a non-crystalline to low crystalline α-olefin type elastomeric copolymer formed from at least two α-olefins,
      (iii) an α-olefin-diene type elastomeric copolymer formed from at least two α-olefins and at least one non-conjugated diene, and
      (iv) an aromatic vinyl type hydrocarbon-conjugated diene copolymer or a hydrogenated product thereof,
in such a proportion that the total amount of the component (B) is 5 to 100 parts by weight based on 100 parts by weight of the component (A).

General formula

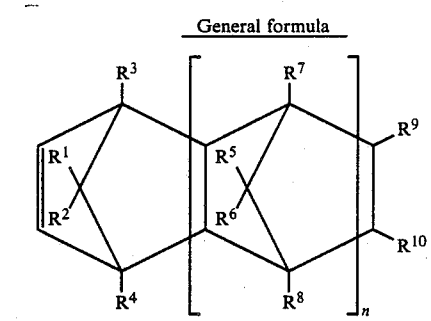

[I]

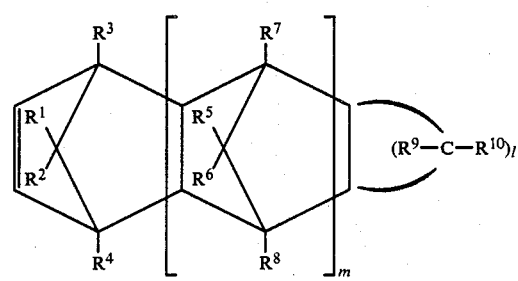

[II]

wherein n and m are each 0 or a positive integer, l is an integer of at least 3, and R¹ to R¹⁰ each represents hydrogen atom, halogen atom or hydrocarbon group.

2. The composition as claimed in claim 1, wherein the cycloolefin type random copolymer containing an ethylene component, at least one other α-olefin component and a cycloolefin component represented by the following formula [I] or [II] is a cycloolefin type random copolymer containing an ethylene component, a propylene component and a cycloolefin component represented by the following general formula [I] or [II], or a cycloolefin type random copolymer containing an ethylene component, a butene component and a cycloolefin component represented by the following general formula [I] or [II].

General formula

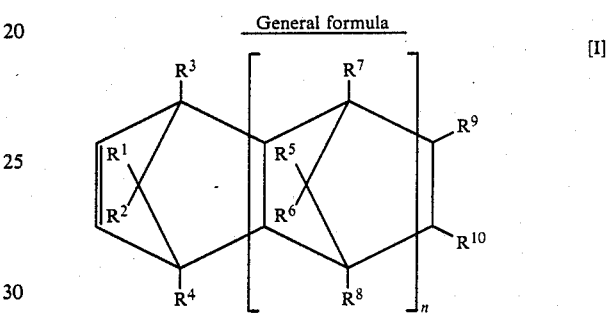

[I]

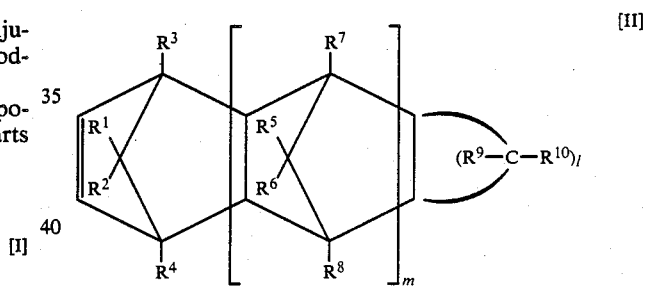

[II]

3. The composition as claimed in claim 1, wherein the α-olefin type elastomeric copolymer is ethylene-propylene copolymer rubber, ethylene-butene copolymer rubber or propylene-butene copolymer rubber.

4. The compositions as claimed in claim 1, wherein the α-olefin-diene type elastomeric copolymer is an ethylene-propylene-diene type elastomeric copolymer.

5. The composition as claimed in claim 1, wherein the aromatic vinyl type hydrocarbon-conjugated diene copolymer or a hydrogenated product thereof is styrene-butadiene copolymer rubber, styrene-butadiene-styrene block copolymer rubber, styrene-isoprene copolymer rubber, styrene-isoprene-styrene block copolymer rubber, hydrogenated styrene-butadiene-styrene block copolymer rubber or hydrogenated styrene-isoprene-styrene block copolymer rubber.

6. A cycloolefin type random copolymer composition characterized by comprising
   (A) a cycloolefin type random copolymer containing an ethylene component and a cycloolefin component represented by the following general formula [I] or [II] and having an intrinsic viscosity [η] of 0.05–10 dl/g as measured at 135° C. in decalin and a softening temperature (TMA) of not lower than 70° C., (B) at least two non-rigid copolymers selected from the group consisting of:
  (i) a cycloolefin type random copolymer containing an ethylene component, at least one other α-olefin component and a cycloolefin component represented by the following general formula [I] or [II] and having an intrinsic viscosity [η] of 0.01-10 dl/g as measured at 135° C. in decalin and a softening temperature (TMA) of below 70° C.,
  (ii) a non-crystalline to low crystalline α-olefin type elastomeric copolymer formed from at least two α-olefins,
  (iii) an α-olefin-diene type elastomeric copolymer formed from at least two α-olefins and at least one non-conjugated diene, and
  (iv) an aromatic vinyl type hydrocarbon-conjugated diene copolymer or a hydrogenated product thereof,
and
(C) an inorganic filler or organic filler, in such a proportion that the total amount of the component (B) is 1 to 100 parts by weight based on 100 parts by weight of the component (A) and the amount of the component (C) is 1 to 100 parts by weight based on 100 parts by weight of the component (A).

General formula

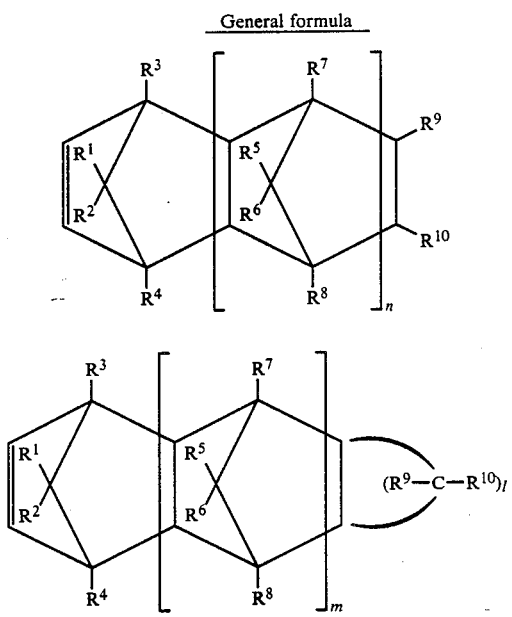

wherein n and m are each 0 or a positive integer, l is an integer of at least 3, and R¹ to R¹⁰ each represents hydrogen atom, halogen atom or hydrocarbon group.

7. The composition as claimed in claim 6, wherein the cycloolefin type random copolymer containing an ethylene component, at least one other α-olefin component and a cycloolefin component represented by the following general formula [I] or [II] is a cycloolefin type random copolymer containing an ethylene component, a propylene component and a cycloolefin component represented by the following general formula [I] or [II], or a cycloolefin type random copolymer containing an ethylene component, a butene component and a cycloolefin component represented by the following general formula [I] or [II].

General formula

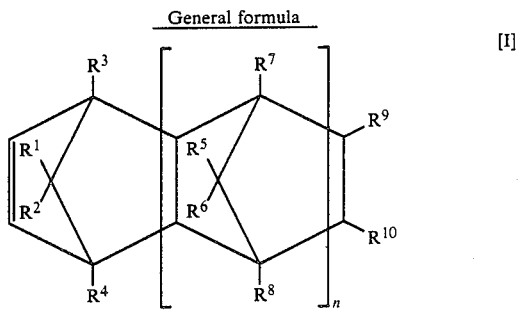

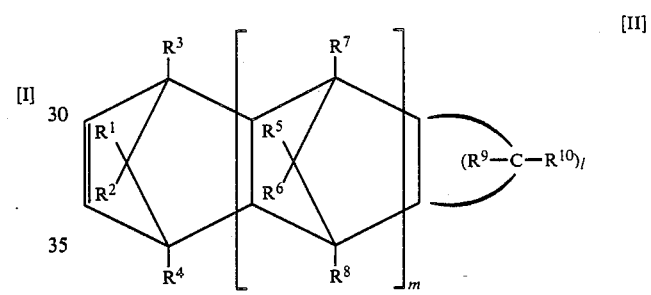

8. The composition as claimed in claim 6, wherein the α-olefin type elastomeric copolymer is ethylene-propylene copolymer rubber, ethylene-butene copolymer rubber or propylene-butene copolymer rubber.

9. The composition as claimed in claim 6, wherein the α-olefin-diene type elastomeric copolymer is an ethylenepropylene-diene type elastomeric copolymer.

10. The composition as claimed in claim 6, wherein the aromatic vinyl type hydrocarbon-conjugated diene copolymer or a hydrogenated product thereof is styrene-butadiene copolymer rubber, styrene-butadiene-styrene block copolymer rubber, styrene-isoprene block copolymer rubber, styrene-isoprene-styrene block copolymer rubber, hydrogenated styrene-butadiene-styrene block copolymer rubber or hydrogenated styrene-isoprene-styrene block copolymer rubber.

* * * * *